(12) United States Patent
Pyo et al.

(10) Patent No.: US 12,484,166 B2
(45) Date of Patent: Nov. 25, 2025

(54) DISPLAY DEVICE

(71) Applicant: LG ELECTRONICS INC., Seoul (KR)

(72) Inventors: Jonggil Pyo, Seoul (KR); Kwaneun Jin, Seoul (KR); Jaeyong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 253 days.

(21) Appl. No.: 18/253,866

(22) PCT Filed: Sep. 15, 2021

(86) PCT No.: PCT/KR2021/012621
§ 371 (c)(1),
(2) Date: May 22, 2023

(87) PCT Pub. No.: WO2022/114477
PCT Pub. Date: Jun. 2, 2022

(65) Prior Publication Data
US 2023/0422417 A1    Dec. 28, 2023

(30) Foreign Application Priority Data
Nov. 27, 2020    (KR) .................. 10-2020-0162827

(51) Int. Cl.
*H05K 5/02*    (2006.01)
(52) U.S. Cl.
CPC ................. *H05K 5/0217* (2013.01)
(58) Field of Classification Search
CPC .. H05K 5/0017; H05K 5/0217; G06F 1/1601; G09F 9/30
USPC ................. 361/807, 727, 809, 810
See application file for complete search history.

(56) References Cited

U.S. PATENT DOCUMENTS 9,170,446 B2 *    10/2015    Kuo ................. G02F 1/133308
2022/0039275 A1 *    2/2022    Kang ................... G06F 1/1603

FOREIGN PATENT DOCUMENTS

| KR | 10-1999-0054046 | 7/1999 | |
| KR | 20100123009 A * | 5/2009 | ............... H04N 5/64 |
| KR | 10-2012-0112746 | 10/2012 | |
| KR | 10-2016-0141255 | 12/2016 | |

(Continued)

OTHER PUBLICATIONS

PCT International Application No. PCT/KR2021/012621, International Search Report dated Jan. 11, 2022, 10 pages.

*Primary Examiner* — Hung S. Bui
(74) *Attorney, Agent, or Firm* — LEE, HONG, DEGERMAN, KANG & WAIMEY

(57) ABSTRACT

A display device is provided. The display device of the present disclosure comprises: a display panel; a frame at which the display panel is installed; a cover assembly including a cover disposed in front of the display panel and movably coupled to the frame; and a lift assembly installed at the frame and moving the cover assembly, wherein the cover assembly comprises: a body having a front surface to which the cover is coupled; a bracket coupled to a rear surface of the body adjacent to one side of the body, and extending long in a direction in which the cover assembly moves; and a plate coupled to the rear surface of the body adjacent to the other side of the body, and extending long in a direction crossing a longitudinal direction of the bracket.

12 Claims, 25 Drawing Sheets

(56) References Cited

FOREIGN PATENT DOCUMENTS

| KR | 20190092980 A | * | 1/2018 | ............... G09F 9/30 |
| KR | 10-2020-0020509 | | 2/2020 | |
| KR | 10-2020-0114337 | | 10/2020 | |

* cited by examiner

[FIG. 1]
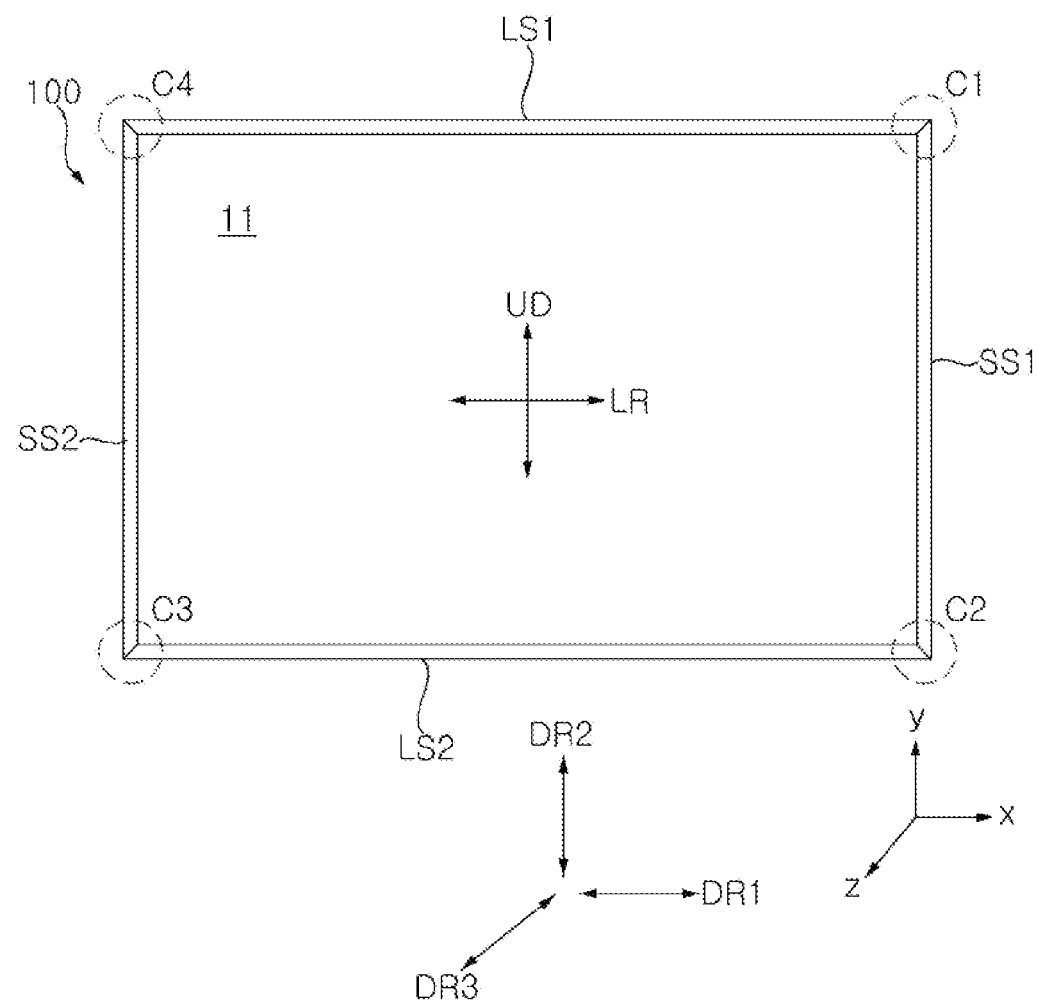

[FIG. 2]
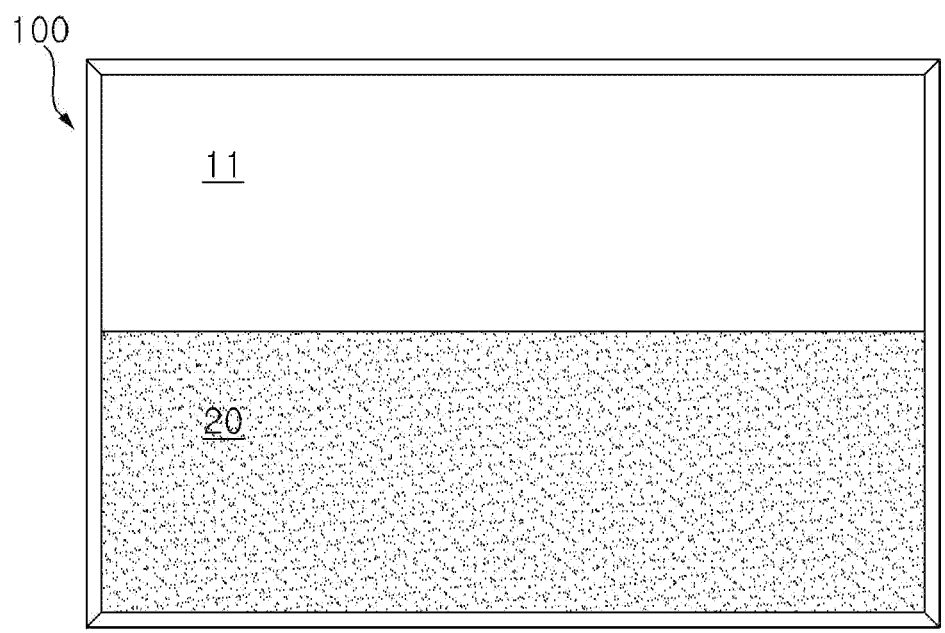
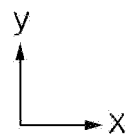

[FIG. 3]
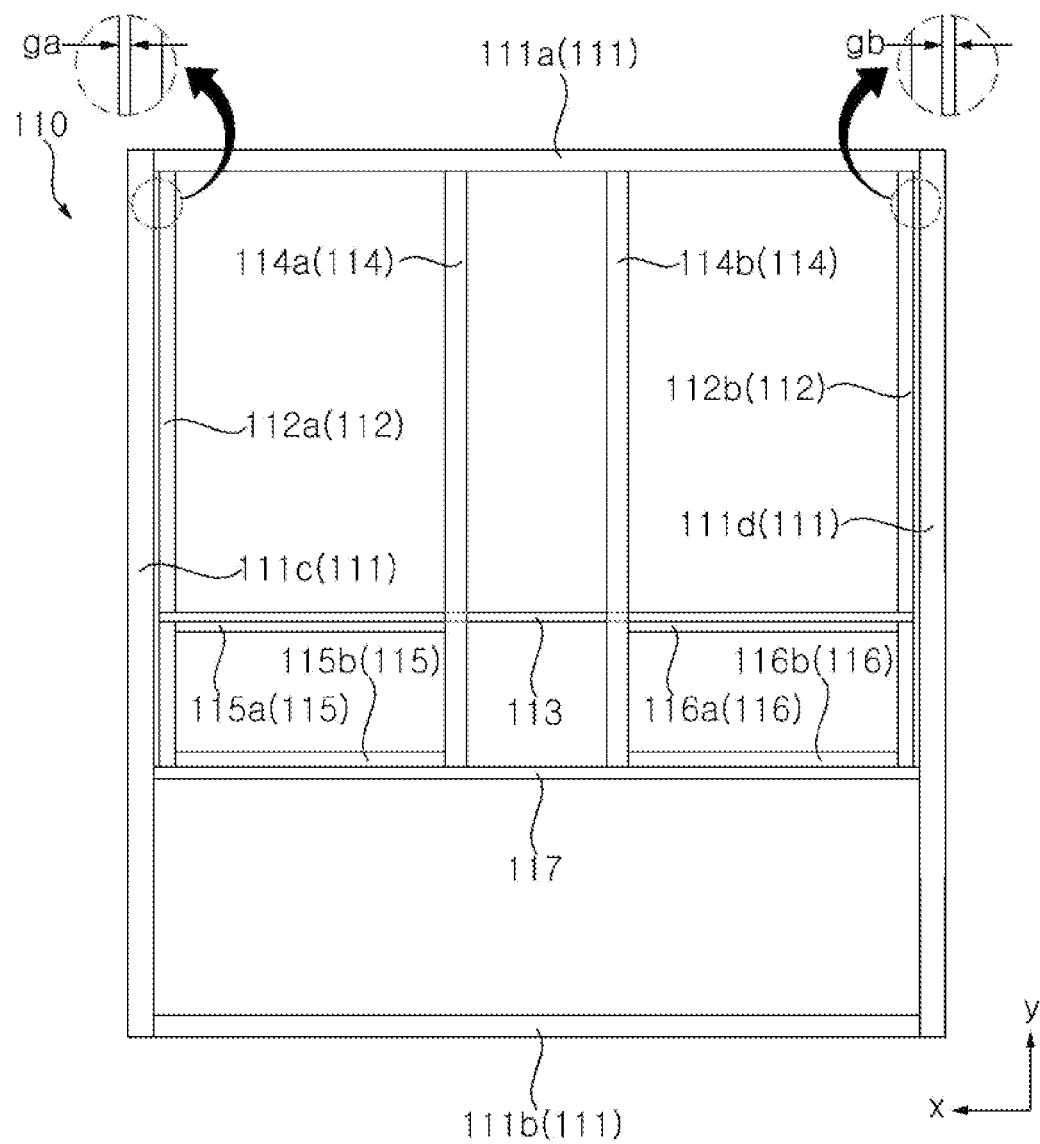

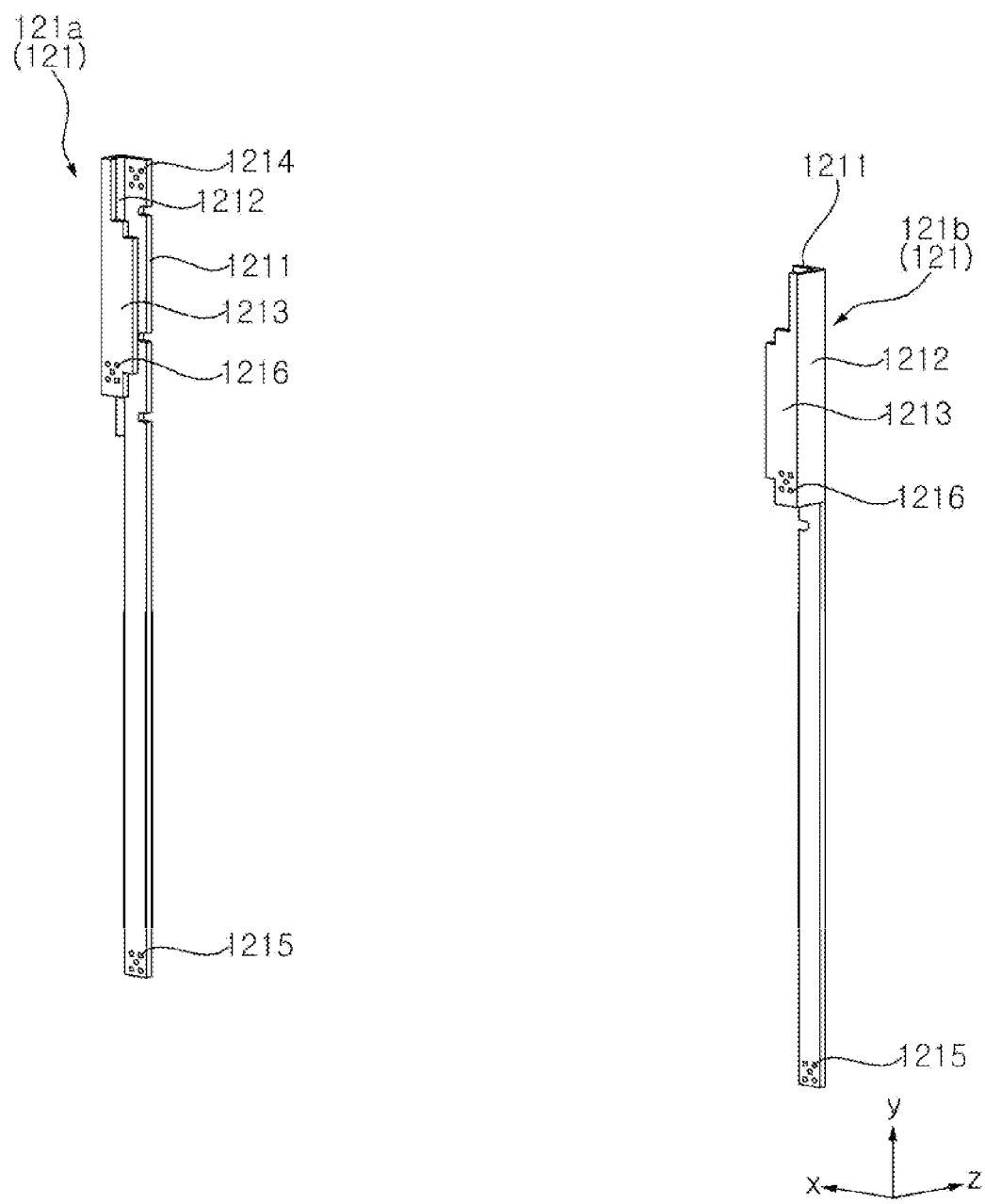
[FIG. 4]

[FIG. 5]
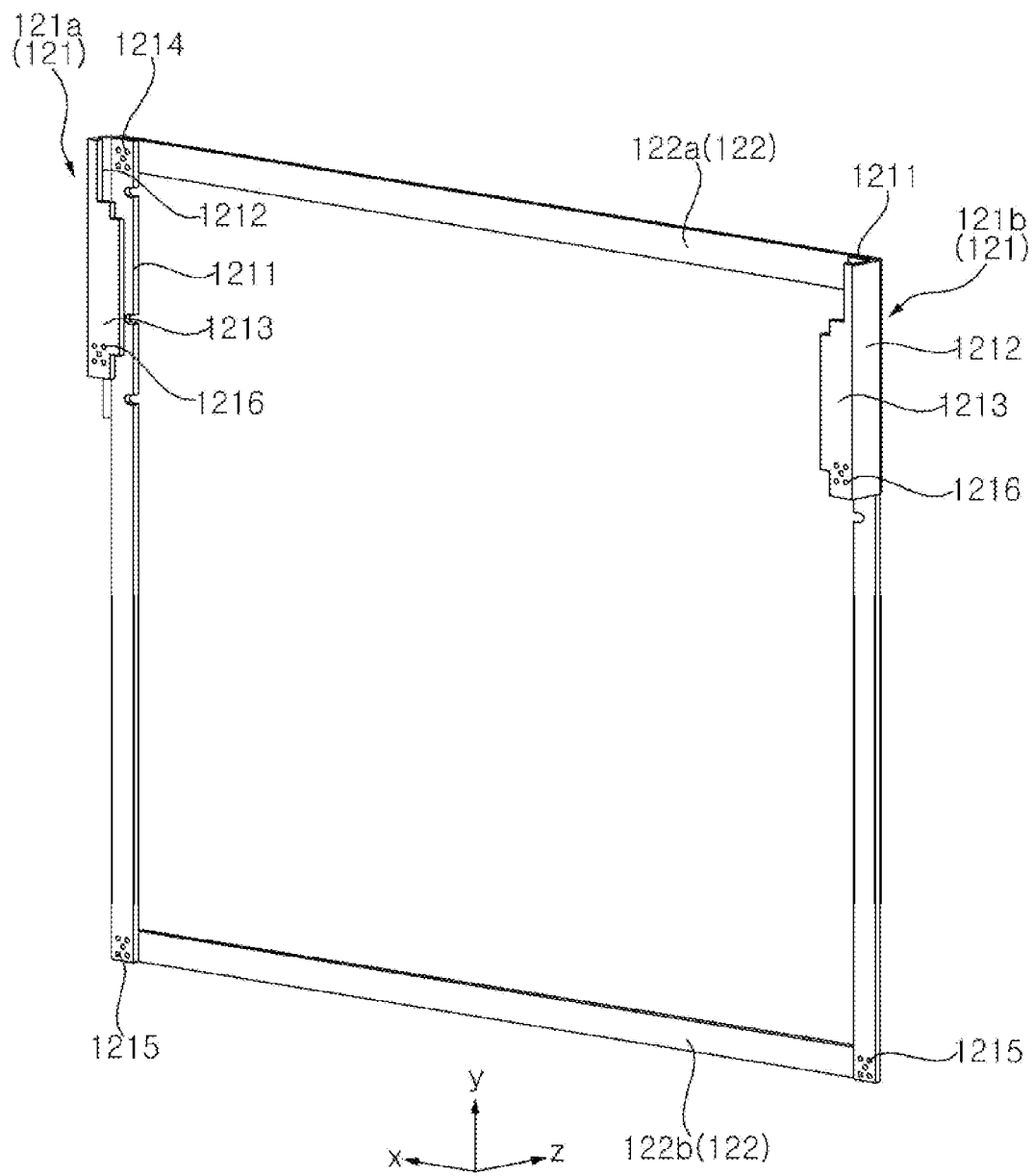

[FIG. 6]
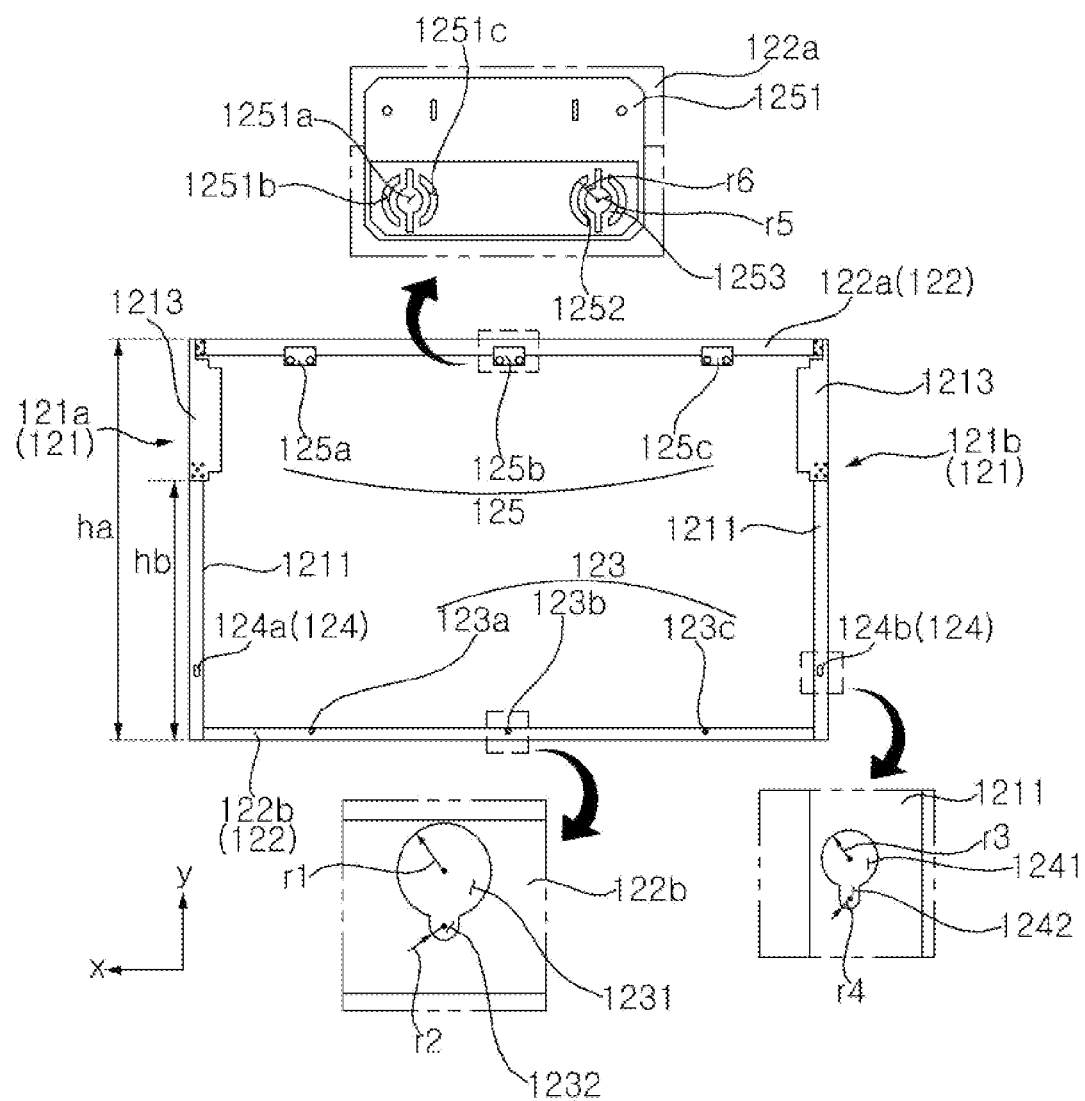

[FIG. 7]
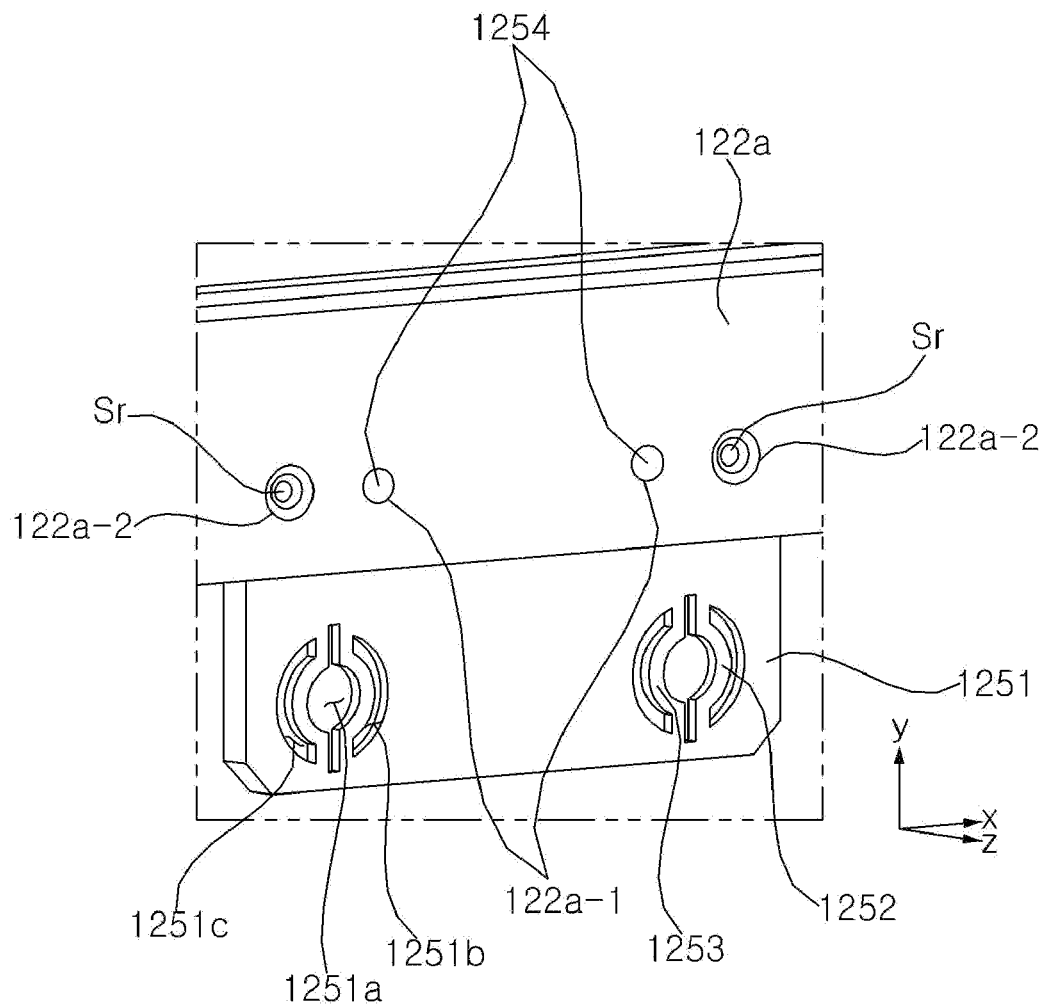

[FIG. 8]
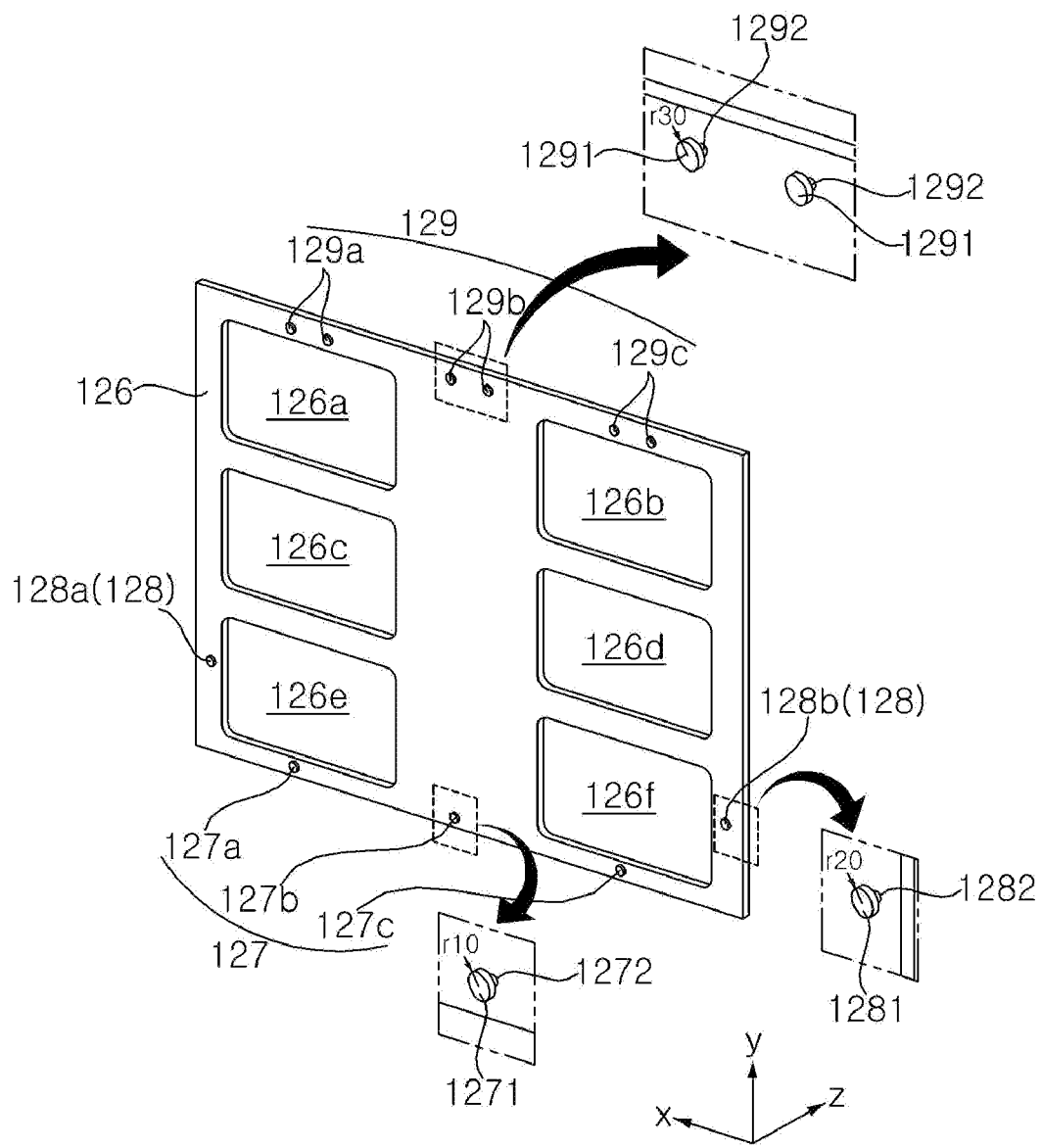

[FIG. 9]
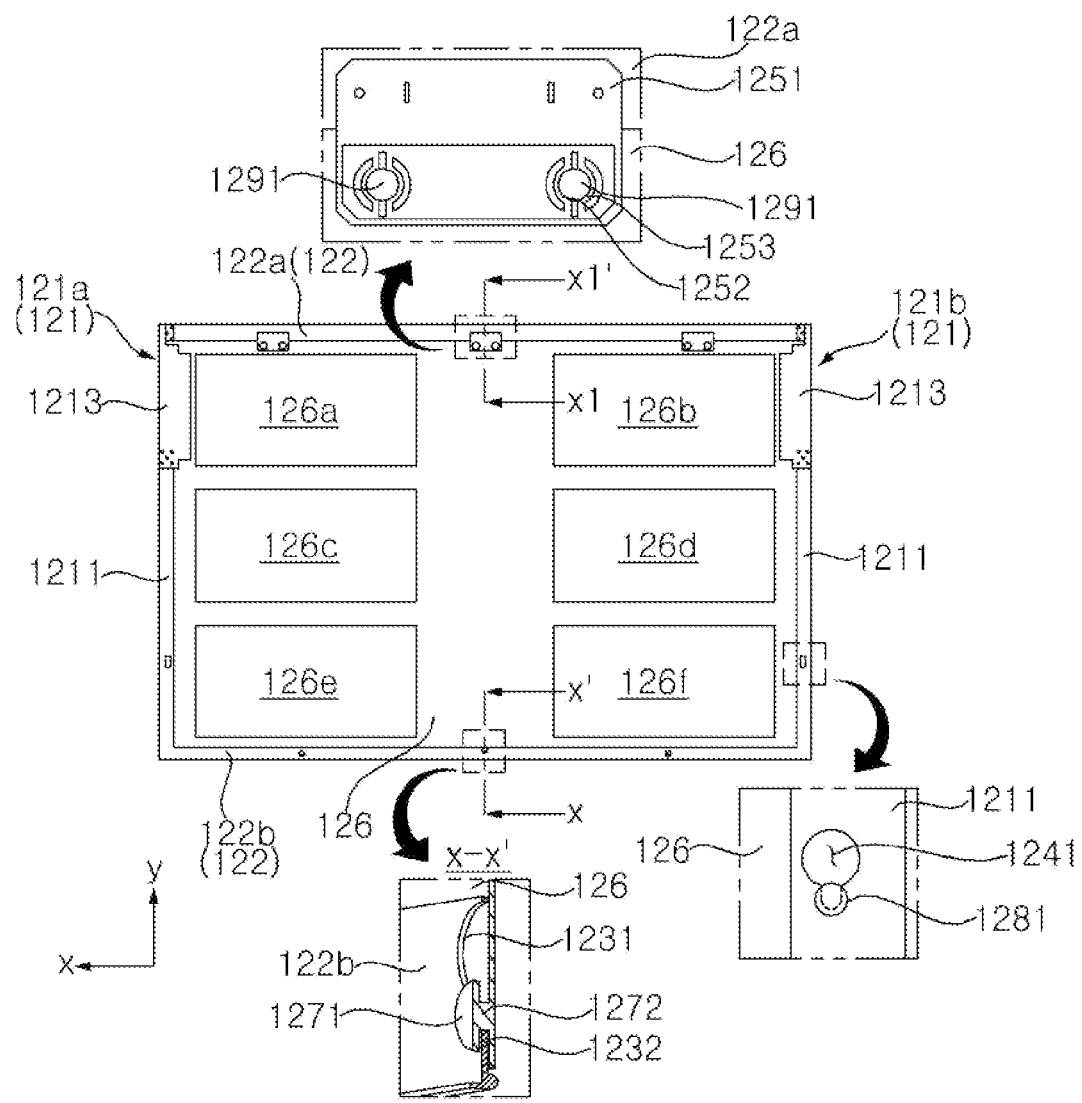

[FIG. 10]
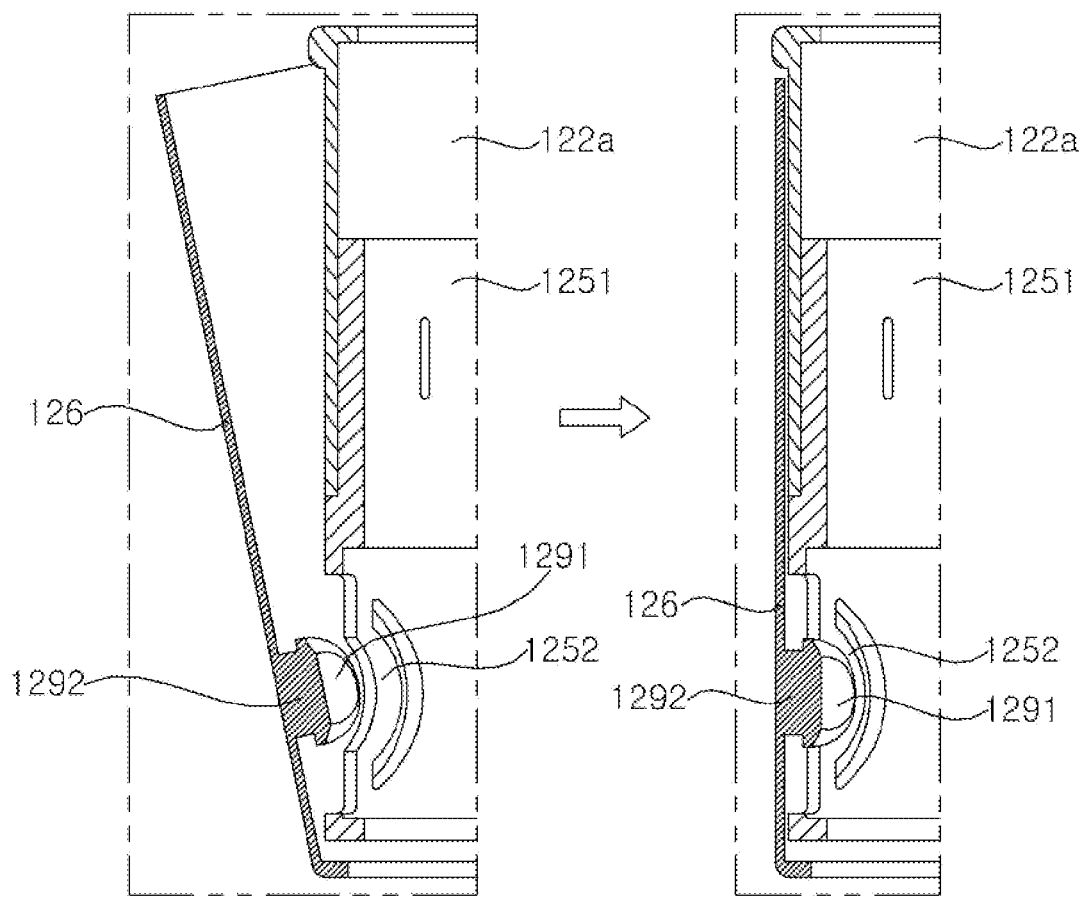

[FIG. 11]
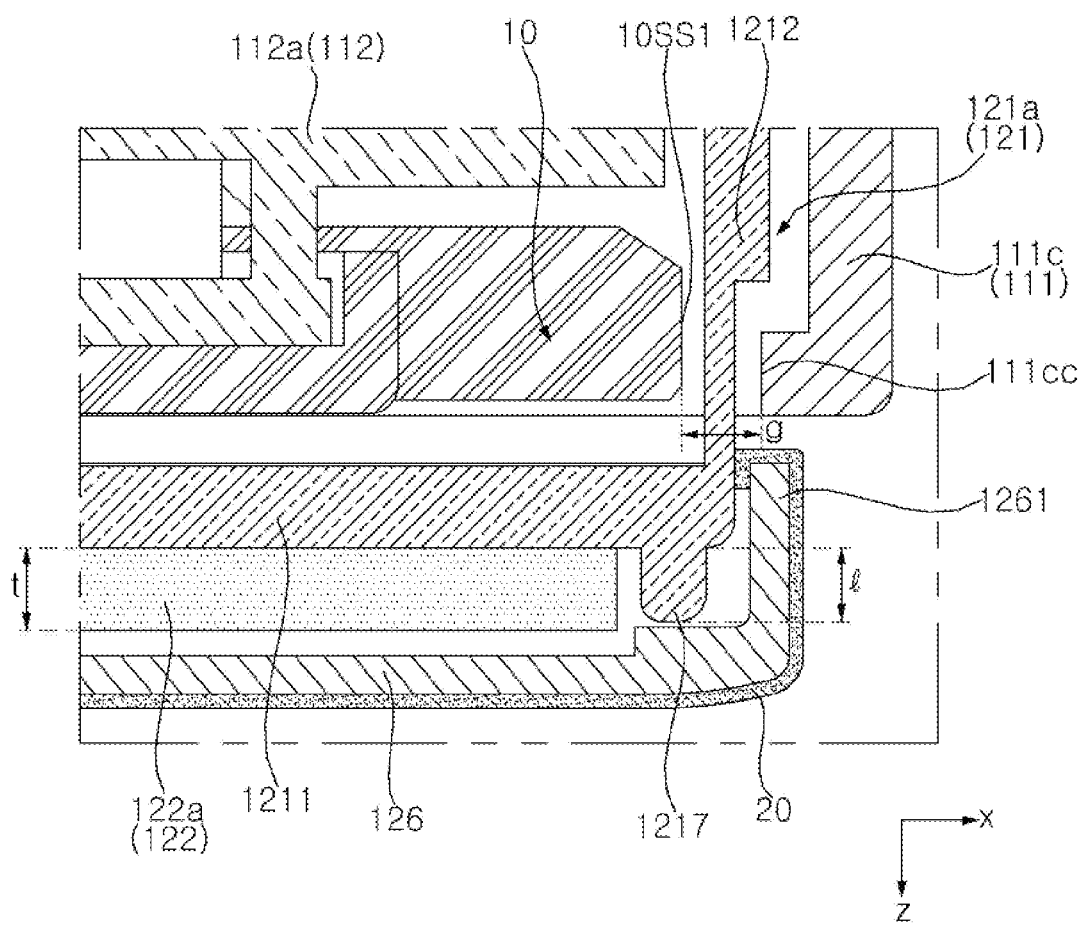

[FIG. 12]
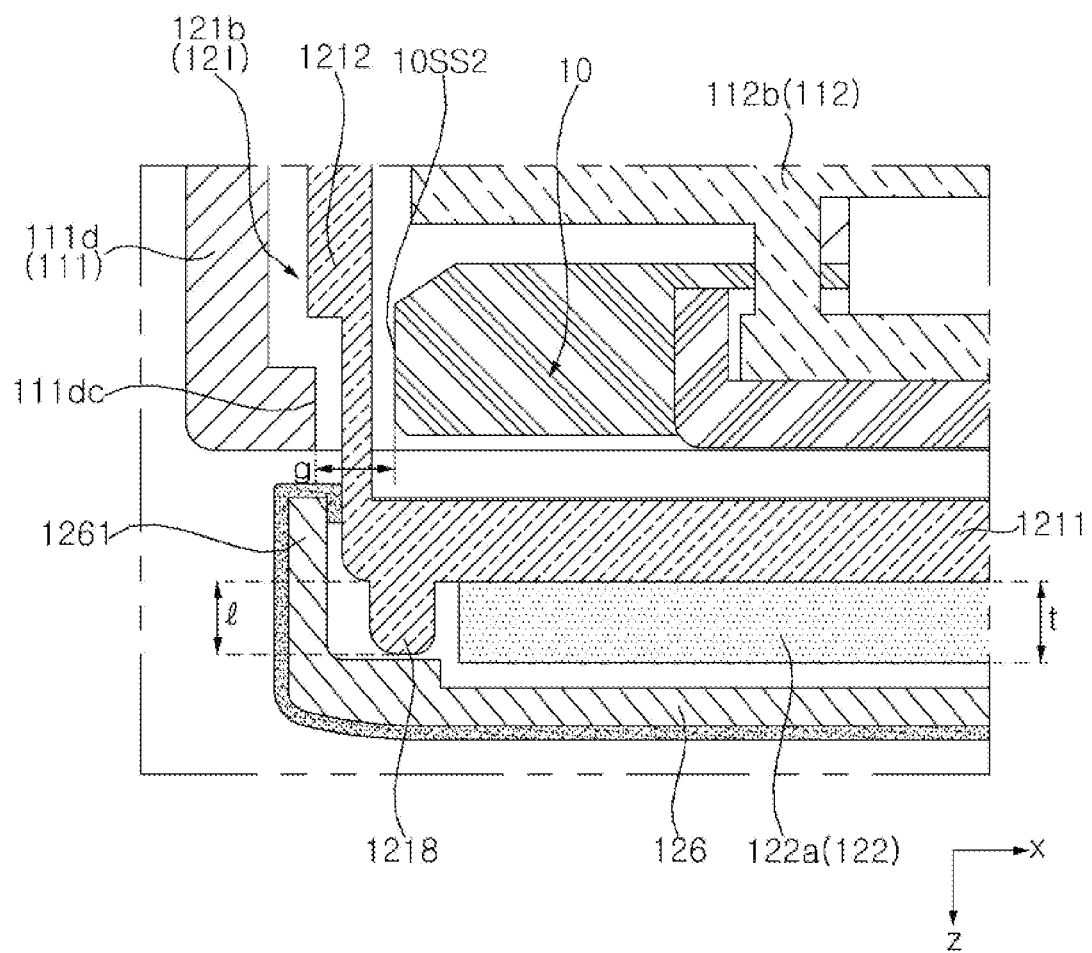

[FIG. 13]
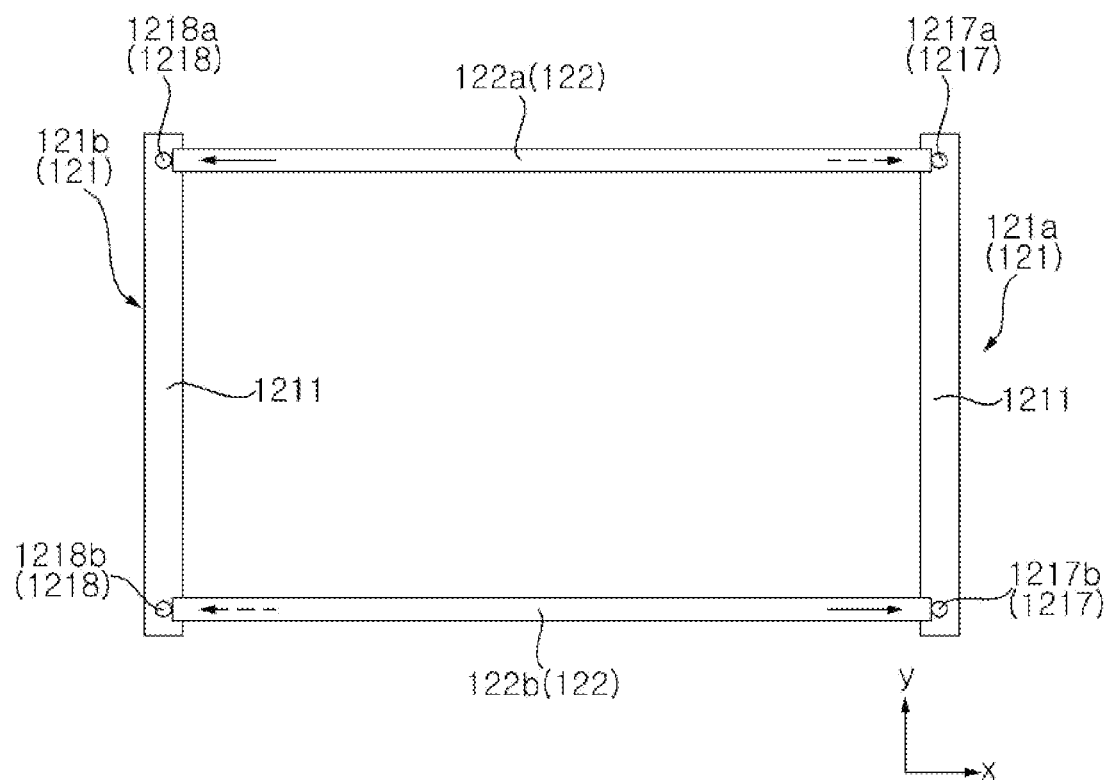

[FIG. 14]
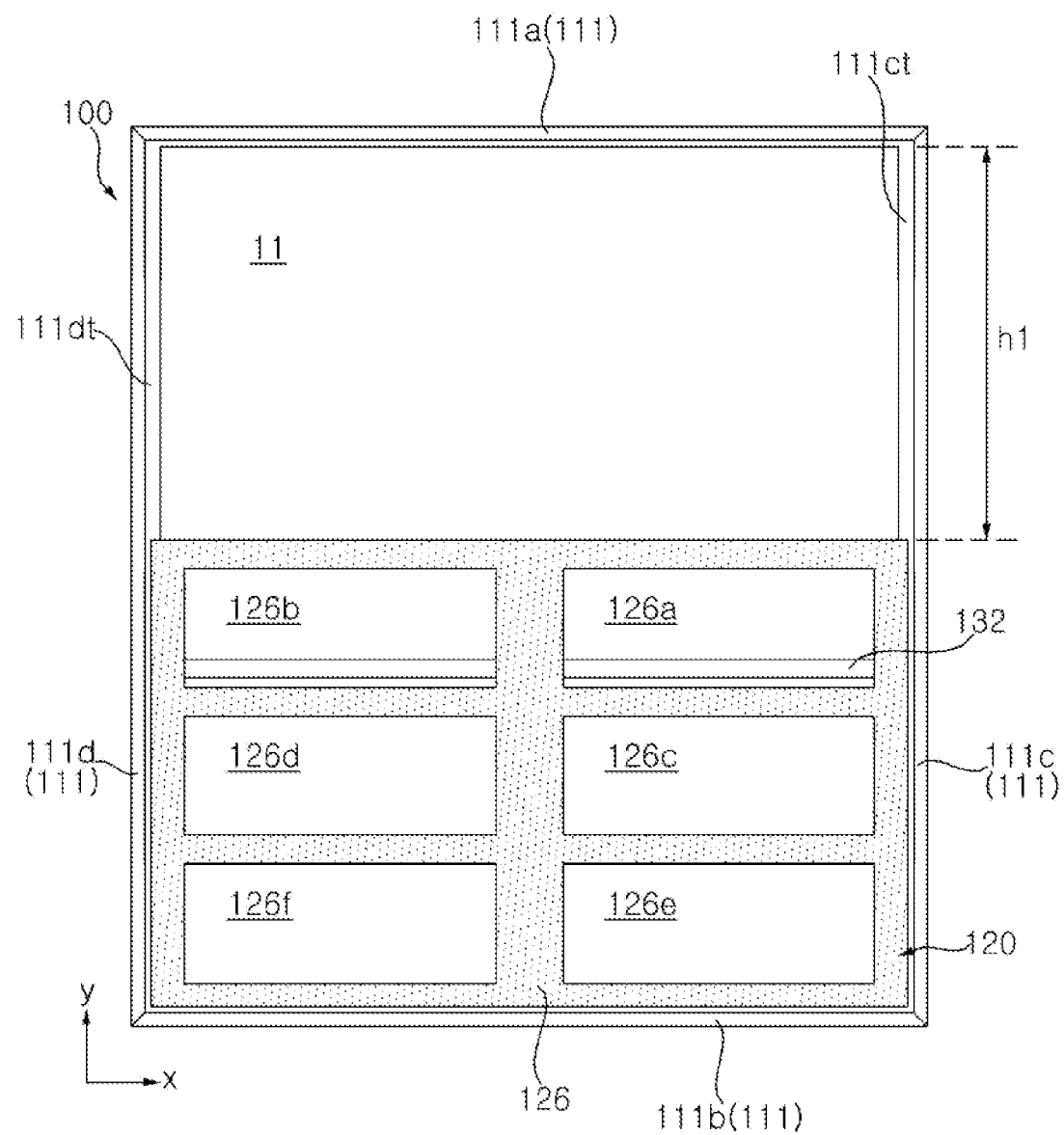

[FIG. 15]
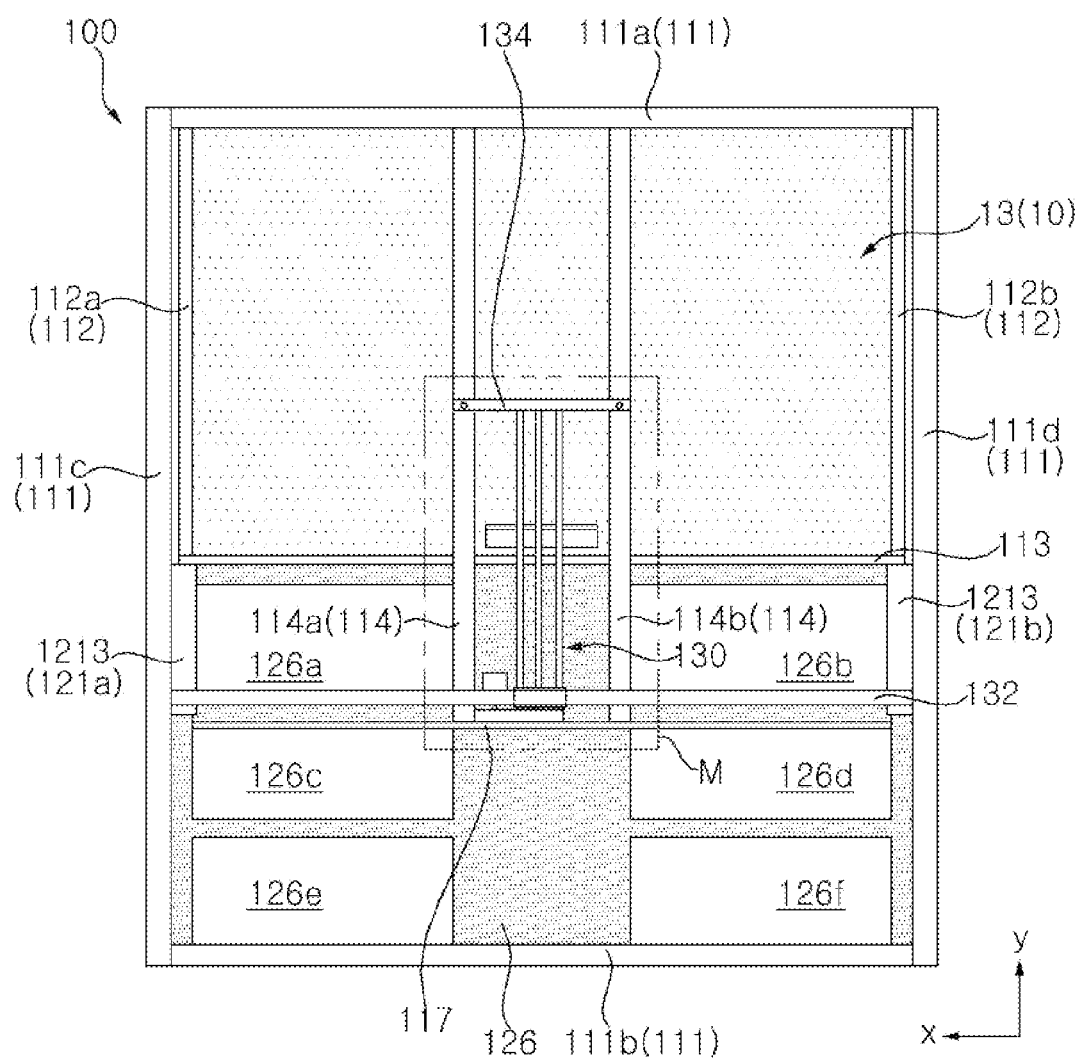

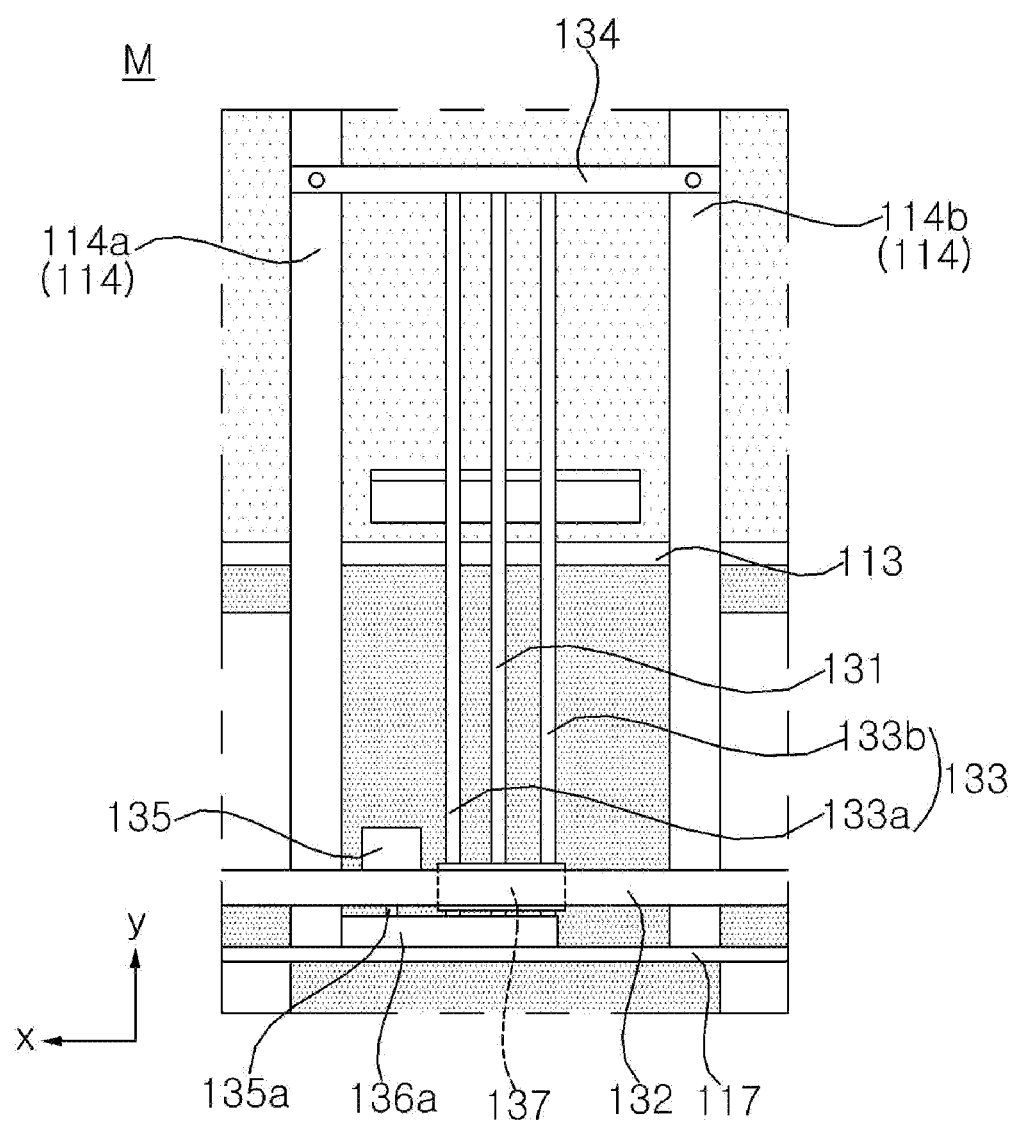
[FIG. 16]

[FIG. 17]
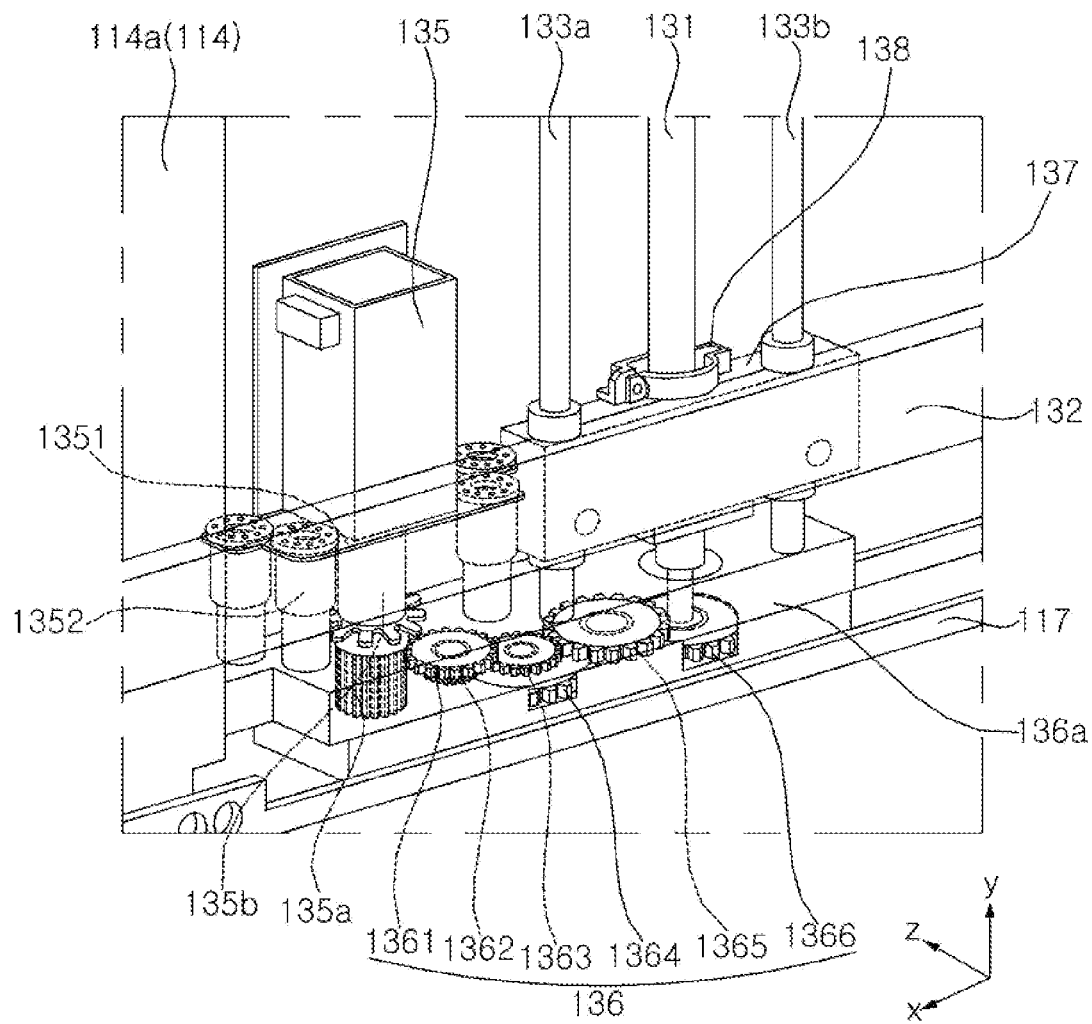

[FIG. 18]
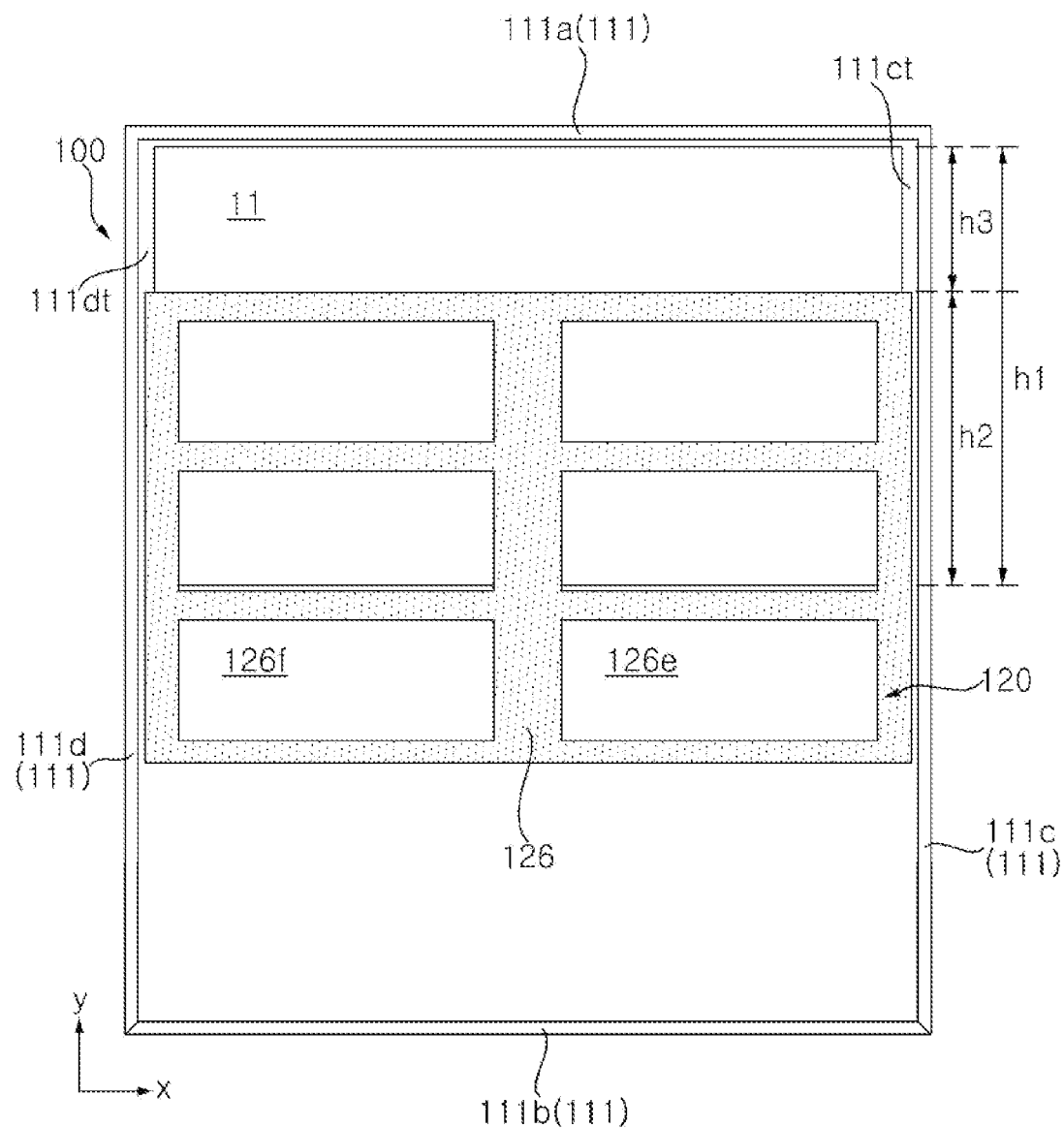

[FIG. 19]
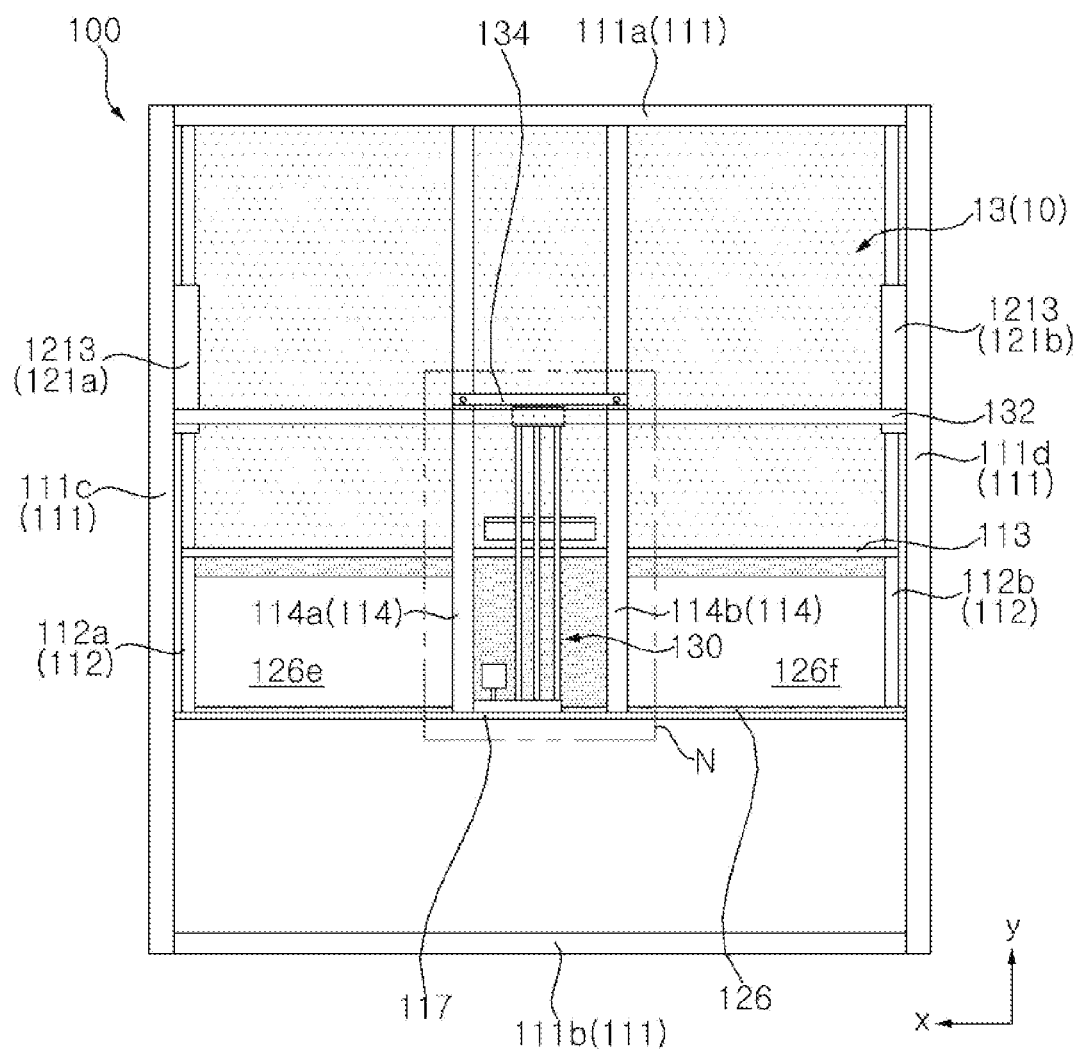

[FIG. 20]
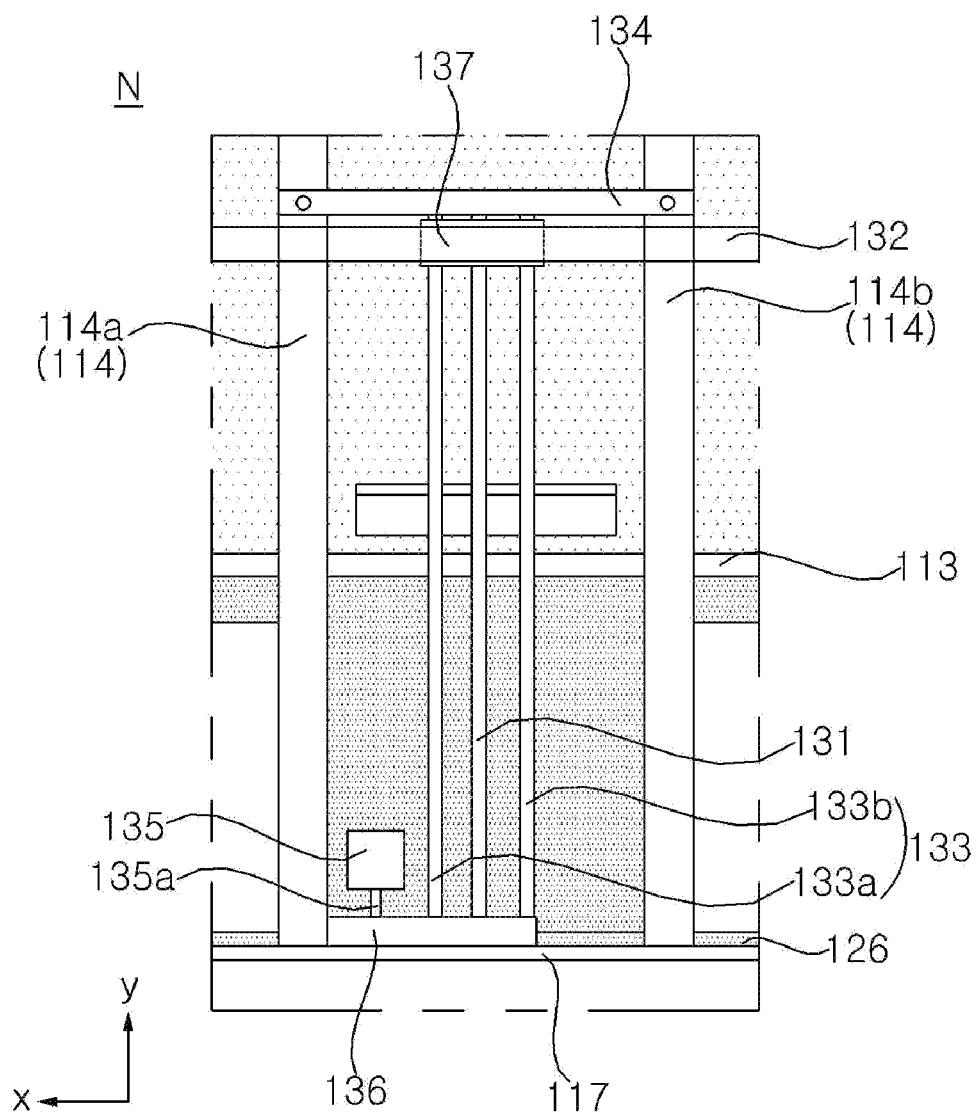

[FIG. 21]
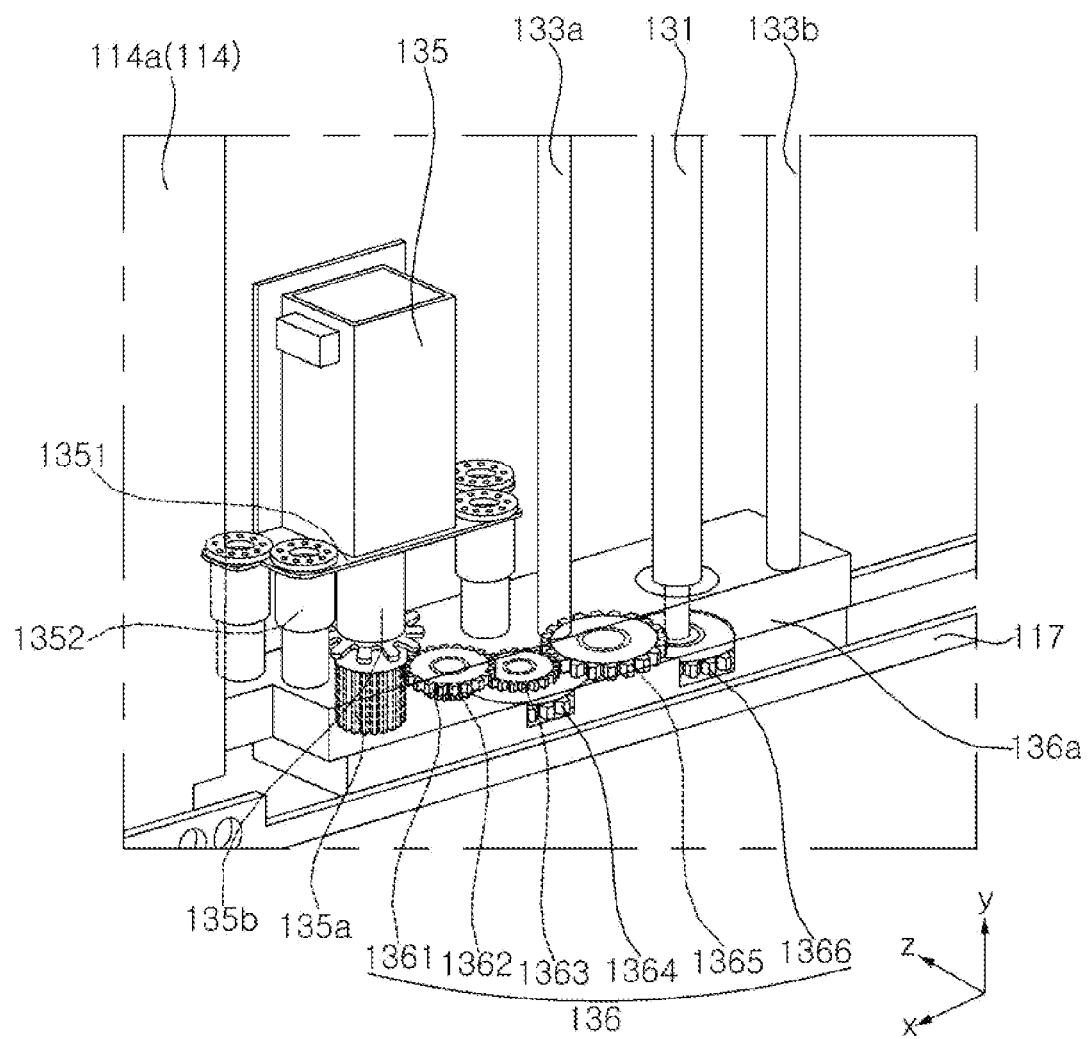

[FIG. 22]
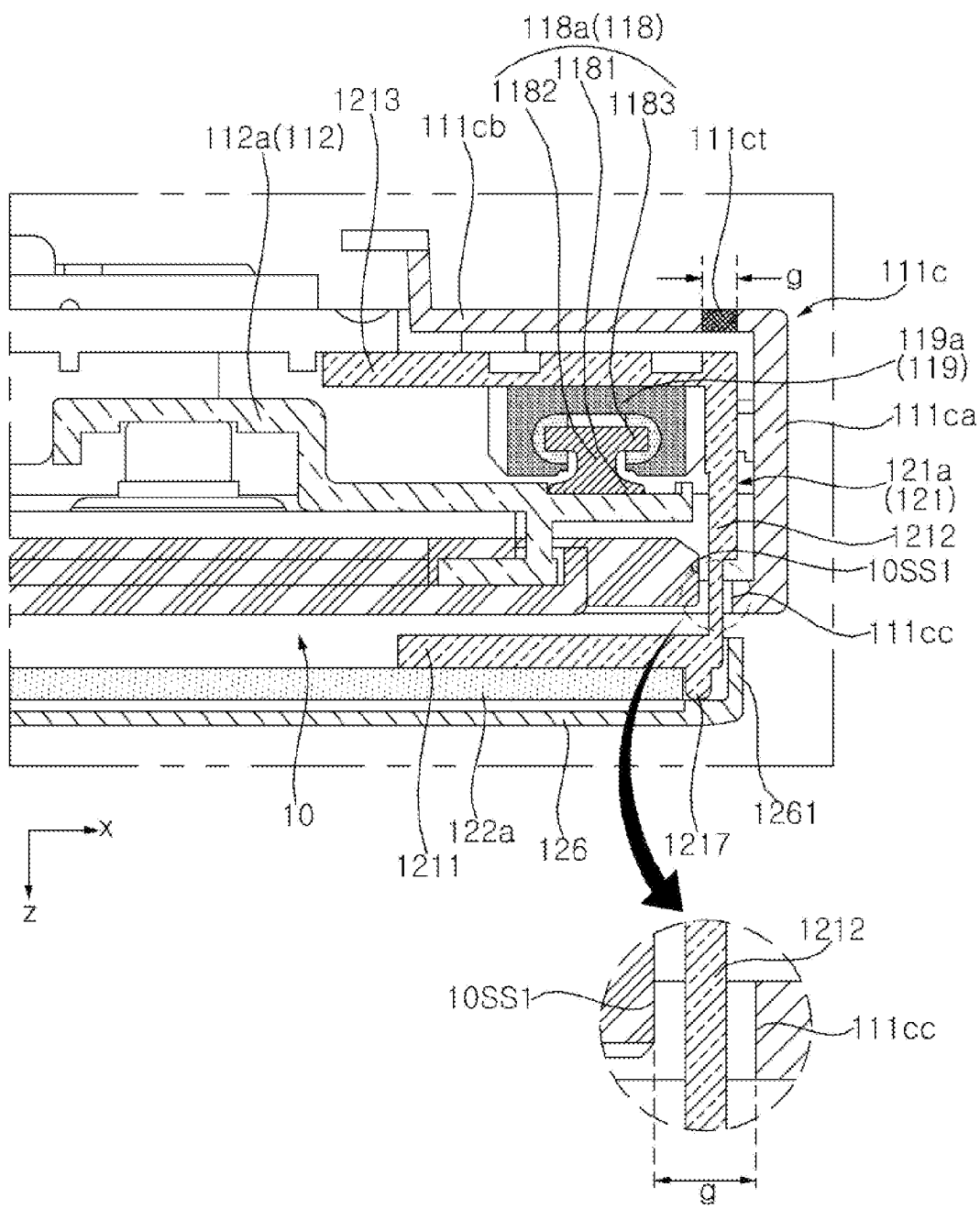

[FIG. 23]
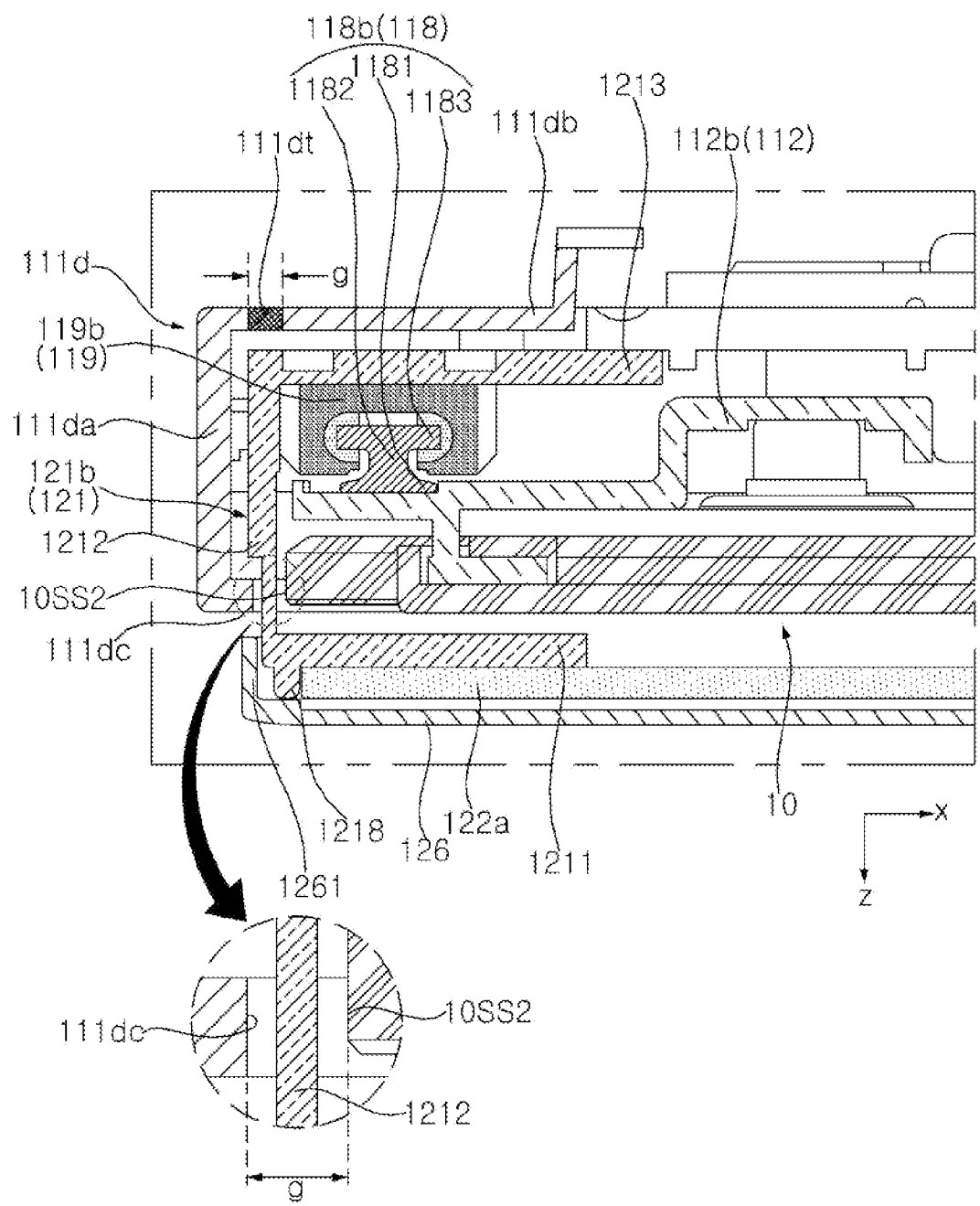

[FIG. 24]
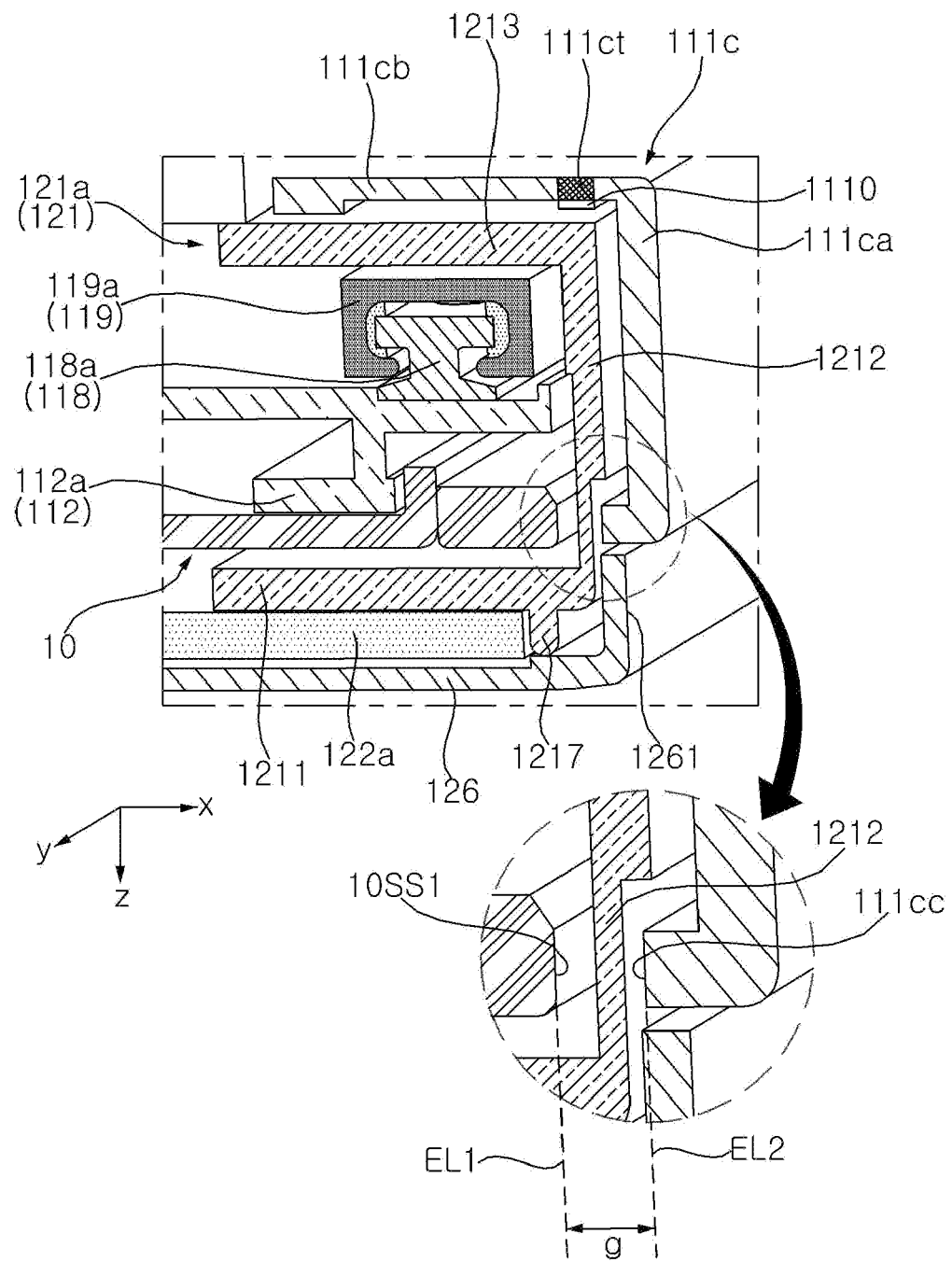

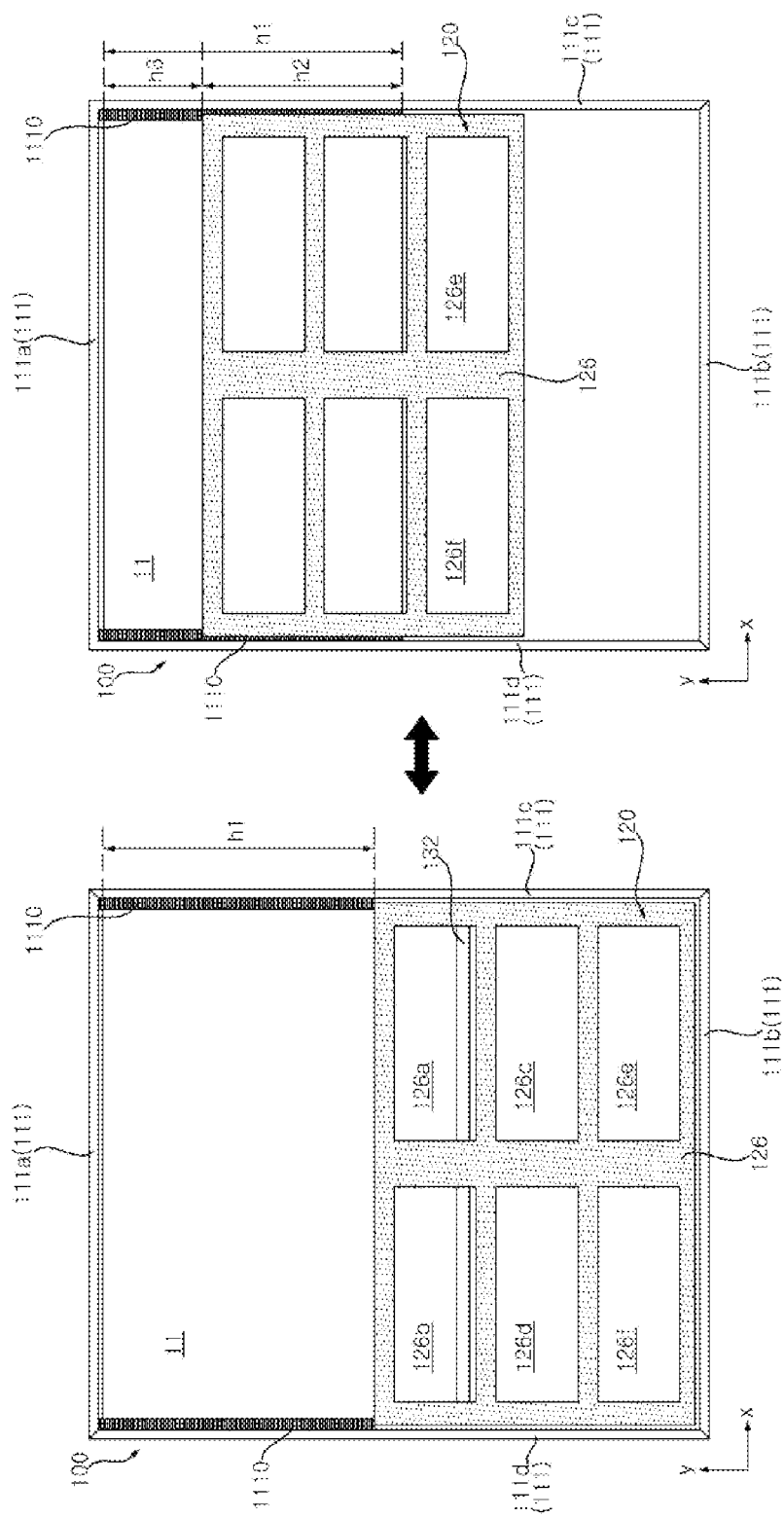
[FIG. 25]

DISPLAY DEVICE

CROSS-REFERENCE TO RELATED APPLICATION(S)

This application is the National Stage filing under 35 U.S.C. 371 of International Application No. PCT/KR2021/012621, filed on Sep. 15, 2021, which claims the benefit of earlier filing date and right of priority to Korean Application No. 10-2020-0162827, filed on Nov. 27, 2020, the contents of which are all hereby incorporated by reference herein in their entireties.

TECHNICAL FIELD

The present disclosure relates to a display device.

BACKGROUND ART

With the development of the information society, there have been growing demands for various types of display devices, and in order to meet these demands, various display devices, such as a liquid crystal display (LCD), an electroluminescent display (ELD), a vacuum fluorescent display (VFD), an organic light emitting diode (OLED) panel, etc., have been studied and used recently.

Among them, the LCD panel includes a TFT substrate and a color substrate which are positioned opposite each other with a liquid crystal layer interposed therebetween, and displays images by using light emitted from a backlight unit. Further, the OLED panel may display images by using a self light-emitting organic layer deposited on a substrate on which transparent electrodes are formed.

Recently, a structure for freely adjusting an angle or position of a display panel is actively researched.

DISCLOSURE OF INVENTION

Technical Problem

It is an objective of the present disclosure to solve the above and other problems.

It is another objective to provide a display device for covering or opening a front surface of a display panel.

It is yet another objective to improve rigidity of a cover assembly covering a front surface of a display panel.

It is yet another objective to prevent unexpected movement or shaking of a cover assembly covering a front surface of a display panel.

It is yet another objective to minimize user's perception of a gap between a display unit and an outer frame.

Solution to Problem

In accordance with an aspect of the present disclosure, the above and other objectives can be accomplished by providing a display device including: a display panel; a frame at which the display panel is installed; a cover assembly including a cover disposed in front of the display panel and movably coupled to the frame; and a lift assembly installed at the frame and moving the cover assembly, wherein the cover assembly comprises: a body having a front surface to which the cover is coupled; a bracket coupled to a rear surface of the body adjacent to one side of the body, and extending long in a direction in which the cover assembly moves; and a plate coupled to the rear surface of the body adjacent to the other side of the body, and extending long in a direction crossing a longitudinal direction of the bracket.

Advantageous Effects of Invention

The display device according to the present disclosure has the following effects.

According to at least one of the embodiments of the present disclosure, a display device for covering or opening a front surface of a display panel may be provided.

According to at least one of the embodiments of the present disclosure, rigidity of a cover assembly covering a front surface of a display panel may be improved.

According to at least one of the embodiments of the present disclosure, unexpected movement or shaking of a cover assembly covering a front surface of a display panel may be prevented.

According to at least one of the embodiments of the present disclosure, user's perception of a gap between a display unit and an outer frame may be minimized.

According to at least one of the embodiments of the present disclosure, a structure for preventing a cover from moving back and forth and/or left and right while the cover is raised or lowered may be provided.

Further scope of applicability of the present disclosure will become apparent from the detailed description given hereinafter. However, it should be understood that the detailed description and specific examples, while indicating preferred embodiments of the present disclosure, are given by illustration only, since various changes and modifications within the spirit and scope of the present disclosure will become apparent to those skilled in the art from this detailed description.

BRIEF DESCRIPTION OF DRAWINGS

FIGS. 1 to 25 are diagrams illustrating examples of a display device according to embodiments of the present disclosure.

MODE FOR THE INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In general, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected with" another element, there may be intervening elements present. In contrast, it will be understood that when an element is referred to as being "directly connected with" another element, there are no intervening elements present.

A singular representation may include a plural representation unless context clearly indicates otherwise.

In the following description, when an example is described with reference to a specific figure, a reference numeral that is not illustrated in the specific figure may be mentioned. The reference numeral that is not illustrated with the specific figure is used in the case in which the reference numeral is indicated in the other figures.

Referring to FIG. 1, a display device 100 may include a display panel 11. The display panel 11 may display an image.

The display device 100 may include a first long side LS1, a second long side LS2 opposite to the first long side LS1, a first short side SS1 adjacent to the first long side LS1 and the second long side LS2, and a second short side SS2 opposite to the first short side SS1. For convenience of explanation, it is illustrated and described that the first and second long sides LS1 and LS2 are longer than the first and second short sides SS1 and SS2, but it is also possible that lengths of the first and second long sides LS1 and LS2 may be approximately equal to lengths of the first and second short sides SS1 and SS2.

A direction parallel to the long sides LS1 and LS2 of the display device 100 may be referred to as a first direction DR1 or a left-right direction LR. A direction parallel to the short sides SS1 and SS2 of the display device 100 may be referred to as a second direction DR2 or an up-down direction UD. A direction perpendicular to the long sides LS1 and LS2 and the short sides SS1 and SS2 of the display device 100 may be referred to as a third direction DR3 or a front-rear direction FR. A direction in which the display panel 11 displays an image may be referred to as a forward direction, and a direction opposite thereto may be referred to as a rearward direction.

A side of the first long side LS1 may be referred to as an upper side or an upper surface. A side of the second long side LS2 may be referred to as a lower side or a lower surface. A side of the first short side SS1 may be referred to as a left side or a left surface. A side of the second short side SS2 may be referred to as a right side or a right surface.

The first long side LS1, the second long side LS2, the first short side SS1, and the second short side SS2 may be referred to as edges of the display device 100. Further, positions where the first long side LS1, the second long side LS2, the first short side SS1, and the second short side SS2 meet each other may be referred to as corners.

For example, a position where the first short side SS1 and the first long side LS1 meet each other may be referred to as a first corner C1. A position where the first short side SS1 and the second long side LS2 meet each other may be referred to as a second corner C2. A position where the second short side SS2 and the second long side LS2 meet each other may be referred to as a third corner C2. A position where the second short side SS2 and the first long side LS1 meet each other may be referred to as a fourth corner C4.

For example, the display panel 11 may be an OLED panel. The display panel 11 may divide an image into a plurality of pixels and may output the image while controlling color, brightness, and chroma of the respective pixels. The display panel 11 may be divided into an active area, in which the image is displayed, and a de-active area in which the image is not displayed. The display panel 11 may generate light corresponding to red, green, or blue color in response to a control signal. Meanwhile, the display panel 11 may be provided as various panels such as LCD.

Referring to FIGS. 1 and 2, a cover 20 may move in the up-down direction in front of the display panel 11.

For example, the cover 20 may cover at least a part of the front surface of the display panel 11 while going up. The cover 20 may expose the front surface of the display panel 11 to the outside while going down.

For another example, the cover 20 may cover at least a part of the front surface of the display panel 11 while going down. The cover 20 may expose the front surface of the display panel 11 to the outside while going up.

Meanwhile, the cover 20 may comprise a metal or fabric material.

Referring to FIG. 3, the display device 100 may include a frame 110. The frame 110 may form a framework of the display device 100. The frame 110 may include an outer frame 111, a guide frame 112, an upper frame 113, a middle frame 114, inner frames 115 and 116, and a lower frame 117.

The outer frame 111 may form a circumference of the frame 110 and may be formed in a shape of a square frame as a whole. The outer frame 111 may include a first outer frame 111a forming an upper end of the outer frame 111, a second outer frame 111b forming a lower end of the outer frame 111, a third outer frame 111c forming a left end of the outer frame 111, and a fourth outer frame 111d forming a right end of the outer frame 111.

The guide frame 112 may be disposed between the first outer frame 111a and the lower frame 117, and may extend in the up-down direction. The guide frame 112 may include a first guide frame 112a adjacent to the third outer frame 111c and a second guide frame 112b adjacent to the fourth outer frame 111d. The first guide frame 112a may be spaced apart from the third outer frame 111c to the right by a first gap ga. The second guide frame 112b may be spaced apart from the fourth outer frame 111d to the left by a second gap gb. For example, the second gap gb may be the same as the first gap ga.

The upper frame 113 may be disposed between the first guide frame 112a and the second guide frame 112b, and may extend in the left-right direction. The upper frame 113 may be coupled to the first guide frame 112a and the second guide frame 112b.

The middle frame 114 may be disposed between the first outer frame 111a and the lower frame 117, and may extend in the up-down direction. The middle frame 114 may be coupled to the first outer frame 111a and the lower frame 117, may include a first middle frame 114a and a second middle frame 114b spaced apart from each other in the left-right direction.

The inner frames 115 and 116 may be disposed between the upper frame 113 and the lower frame 117, and may extend in the left-right direction. The inner frames 115 and 116 may be disposed between the first guide frame 112a and the first middle frame 114a, may be coupled to the first guide frame 112a and the first middle frame 114a, and may include a pair of first inner frames 115a, 115b spaced apart from each other in the up-down direction. The inner frames 115 and 116 may be disposed between the second guide frame 112b and the second middle frame 114b, may be coupled to the second guide frame 112b and the second middle frame 114b, and may include a pair of second inner frames 116a and 116b spaced apart from each other in the up-down direction.

The lower frame 117 may be disposed below the upper frame 113. The lower frame 117 may be disposed between the third outer frame 111c and the fourth outer frame 111d, and may extend in the left-right direction. The lower frame 117 may be coupled to the third outer frame 111c and the fourth outer frame 111d.

Referring to FIG. 4, the bracket 121 may extend in the up-down direction. The bracket 121 may include a first part 1211, a second part 1212, and a third part 1213.

The first part 1211 may form a front surface of the bracket 121 and may be a flat plate extending in the up-down direction. The second part 1212 may be bent rearward from the first part 1211 to form a side of the bracket 121. The second part 1212 may be provided on an upper portion of the first part 1211. An upper end of the second part 1212 may be connected to an upper end of the first part 1211. A length of the second part 1212 may be less than ⅓ of a length of the first part 1211. The third part 1213 may be bent left or right from the second part 1212 to face the first part 1211. The third part 1213 may be spaced apart from the first part 1211 rearward by a certain length.

For example, the first part 1211, the second part 1212, and the third part 1213 may be provided as one body. For another example, the first part 1211, the second part 1212, and the third part 1213 may be separately provided, and may be coupled to each other through a screw coupling, welding, or the like.

The bracket 121 may include a first bracket 121a and a second bracket 121b spaced apart from each other in the left-right direction. For example, the first bracket 121a and the second bracket 121b may be symmetrical to each other based on an imaginary line located in a middle of the first bracket 121a and the second bracket 121b extending in the up-down direction.

Each of the first bracket 121a and the second bracket 121b may include the first part 1211, second part 1212, and third part 1213. In this case, the second part 1212 of the first bracket 121a may form a left surface of the first bracket 121a, and the third part 1213 of the first bracket 121a may be bent from the second part 1212 to the right. The second part 1212 of the second bracket 121b may form a right surface of the second bracket 121b, and the third part 1213 of the second bracket 121b may be bent from the second part 1212 to the left.

Meanwhile, a first upper hole 1214 may be formed to penetrate the first part 1211 in the front-rear direction and may be adjacent to the upper end of the first part 1211. A lower upper hole 1215 may be formed to penetrate the first part 1211 in the front-rear direction and may be adjacent to a lower end of the first part 1211. A fastening hole 1216 may be formed to penetrate the third part 1213 in the front-rear direction and may be adjacent to a lower end of the third part 1213.

Referring to FIG. 5, a plate 122 may extend in the left-right direction. The plate 122 may include a first plate 122a and a second plate 122b spaced apart from each other in the up-down direction.

The first plate 122a may be disposed between the first bracket 121a and the second bracket 121b, and may extend in the left-right direction. The first plate 122a may be coupled to the first bracket 121a and the second bracket 121b at a position adjacent to an upper end of the first bracket 121a and an upper end of the second bracket 121b. In other words, a left end of the first plate 122a may be adjacent to the upper end of the first bracket 121a, and a right end of the first plate 122a may be adjacent to the upper end of the second bracket 121b.

For example, a fastening member such as a screw may pass through the first upper hole 1214 of the first bracket 121a and be fastened to a portion adjacent to the left end of the first plate 122a. For example, a fastening member such as a screw may pass through the first upper hole 1214 of the second bracket 121b and be fastened to a portion adjacent to the right end of the first plate 122a.

The second plate 122b may be disposed between the first bracket 121a and the second bracket 121b, and may extend in the left-right direction. The second plate 122b may be coupled to the first bracket 121a and the second bracket 121b at a position adjacent to a lower end of the first bracket 121a and a lower end of the second bracket 121b. In other words, a left end of the second plate 122b may be adjacent to the lower end of the first bracket 121a, and a right end of the second bracket 122b may be adjacent to the lower end of the second bracket 121b.

For example, a fastening member such as a screw may pass through the first lower hole 1215 of the first bracket 121a and be fastened to a portion adjacent to the left end of the second plate 122b. For example, a fastening member such as a screw may pass through the first lower hole 1215 of the second bracket 121b and be fastened to a portion adjacent to a right end of the second plate 122b.

The bracket 121 and the plate 122 may have a shape of a square frame as a whole. The bracket 121 and the plate 122 may comprise a metal material. Accordingly, torsional rigidity and/or bending rigidity of the bracket 121 and the plate 122 may be improved.

Referring to FIGS. 6 and 7, a lower hole 123 may be formed to penetrate the second plate 122b in the front-rear direction. The lower hole 123 may have a shape in which holes having different radii are combined. That is, the lower hole 123 may be divided into a first hole 1231 having a first radius r1 and a second hole 1232 having a second radius r2. The second radius r2 may be less than the first radius r1, and the second hole 1232 may be combined with the first hole 1231 at a lower side of the first hole 1231. For example, the lower hole 123 may include a first lower hole 123a, a second lower hole 123b, and a third lower hole 123c spaced apart from each other in the left-right direction.

A side hole 124 may be formed to penetrate the first part 1211 of the first bracket 121a and the first part 1211 of the second bracket 121b in the front-rear direction. The side hole 124 may have a shape in which holes having different radii are combined. That is, the side hole 124 may be divided into a third hole 1241 having a third radius r3 and a fourth hole 1242 having a fourth radius r4. The fourth radius r4 may be less than the third radius r3, and the fourth hole 1242 may be combined with the third hole 1241 at a lower side of the third hole 1241. For example, the side hole 124 may include a first side hole 124a formed in the first bracket 121a and a second side hole 124b formed in the second bracket 121b.

Meanwhile, the third part 1213 may have an upper end having a first height ha and a lower end having a second height hb, with respect to a lower end of the second plate 122b. In this case, heights of the first side hole 124a and the second side hole 124b with respect to the lower end of the second plate 122b may be less than the second height hb.

A holder 125 may include a body 1251 coupled to a rear surface of the first plate 122a. The body 1251 may be formed of a flat plate as a whole. An upper hole 1251a may be formed to penetrate the body 1251 in the front-rear direction. The upper hole 1251a may have a shape in which a circular hole having a fifth radius r5 and a slit are combined. The slit may be elongated in the up-down direction at upper and lower sides of the hole. Meanwhile, the holder 125 may be referred to as a latch.

A first gap 1251b may be spaced apart from the upper hole 1251a to the left and may be formed in an arc shape having a sixth radius r6. In this case, a portion 1252 of the body 1251 may be disposed between the upper hole 1251a and the first gap 1251b, may have elasticity, and may be referred to as a first gimbal or a first rib. The second gap 1251c may be spaced apart from the upper hole 1251a to the right, and may be formed in an arc shape having a sixth radius r6. In this case, a part 1253 of the body 1251 may disposed between the upper hole 1251a and the second gap 1251c, may have elasticity, and may be referred to as a second gimbal or a second rib. For example, a pair of fastening portions including the upper hole 1251a, the first gap 1251b, and the second gap 1251c may be provided to be spaced apart from each other in the left-right direction.

Meanwhile, a boss 1254 may protrude forward from a front surface of the body 1251 of the holder 125 and may be inserted into a boss hole 122a-1 formed in the first plate 122a. Further, a fastening member Sr, such as a screw, may pass through the body 1251 of the holder 125 and may be fastened to a fastening hole 122a-2 formed in the first plate 122a. Thus, the holder 125 may be detachably coupled to the first plate 122a. For example, the holder 125 may include a first holder 125a, a second holder 125b, and a third holder 125c spaced apart from each other in the left-right direction.

Referring to FIG. 8, the body 126 may have a front surface to which the cover 20 (see FIG. 2) is coupled. For example, the body 126 may comprise a metal or plastic material. In this case, even though the body 126 comprises a plastic material, since the bracket 121 and the plate 122 described above with reference to FIG. 5 comprise a metal material, sufficient rigidity of a cover assembly 120 may be secured.

For example, the body 126 may include a plurality of holes 126a, 126b, 126c, 126d, 126e, 126f formed to penetrate the body 126 in the front-rear direction and spaced apart from each other. In this case, a weight of the body 126 may be reduced. For another example, the body 126 may not have holes. In this case, rigidity of the body 126 may be improved.

A lower pin 127 may protrude rearward from a rear surface of the body 126. The lower pin 127 may be adjacent to a lower end of the body 126. The lower pin 127 may have a lower head 1271 having a certain radius r10 and a lower neck 1272 coupled to the lower head 1271 and the body 126 between the lower head 1271 and the body 126. In this case, a radius of the lower neck 1272 may be less than the radius r10 of the lower head 1271. For example, the lower pin 127 may include a first lower pin 127a, a second lower pin 127b, and a third lower pin 127c spaced apart from each other in the left-right direction.

A side pin 128 may protrude rearward from the rear surface of the body 126. The side pin 128 may be adjacent to a left end or a right end of the body 126. The side pin 128 may have a side head 1281 having a certain radius r20 and a side neck 1282 coupled to the side head 1281 and the body 126 between the side head 1281 and the body 126. In this case, a radius of the side neck 1282 may be less than the radius t20 of the side head 1281. For example, the side pin 128 may include a first side pin 128a adjacent to the left end of the body 126 and a second side pin 128b adjacent to the right end of the body 126.

An upper pin 129 may protrude rearward from the rear surface of the body 126, and may be provided as a pair spaced apart from each other in the left-right direction. The upper pin 129 may be adjacent to a top of body 126. The upper pin 129 may have an upper head 1291 having a certain radius r30 and an upper neck 1292 coupled to the upper head 1291 and the body 126 between the upper head 1291 and the body 126. In this case, a radius of the upper neck 1292 may be less than the radius r30 of the upper head 1291. For example, the upper pin 129 may include a first upper pin 129a, a second upper pin 129b, and a third upper pin 129c spaced apart from each other in the left-right direction.

Referring to FIGS. 9 and 10, the body 126 may be detachably coupled to the bracket 121 and the plate 122 in front of the bracket 121 and the plate 122. Meanwhile, the cover assembly 120 may include the bracket 121, the plate 122, the body 126, and the cover 20 (see FIG. 2).

The radius r10 (see FIG. 8) of the lower head 1271 may be less than or equal to the first radius r1 (see FIG. 6) of the first hole 1231. Also, the radius r10 of the lower head 1271 may be greater than the second radius r2 of the second hole 1232 (see FIG. 6). That is, the lower head 1271 may be moved downward after passing through the first hole 1231 by a user or the like, and may be hung on a rear surface of the second frame 122b forming a boundary of the second hole 1232. Also, the lower end of the body 126 may be hung on a front surface of the second frame 121b forming a boundary of the second hole 1232. Accordingly, a movement of the lower pin 127 in the front-rear direction may be restricted.

The radius r20 (see FIG. 8) of the side head 1281 may be less than or equal to the third radius r3 (see FIG. 6) of the third hole 1241. Also, the radius r20 of the side head 1281 may be greater than the fourth radius r4 of the fourth hole 1242 (see FIG. 6). That is, the side head 1281 may be moved downward after passing through the third hole 1241 by a user or the like, may be hung on a rear surface of the first part 1211 of the first bracket 121a and/or the second bracket 122a forming a boundary of the fourth hole 1242.

The radius r30 (see FIG. 8) of the upper head 1291 may be greater than the fifth radius r5 (see FIG. 6) of the upper hole 1251a but less than the sixth radius r6 (see FIG. 6) of the first gap 1251b or the second gap 1251c. That is, the upper head 1291 may pass through the upper hole 1251a while spreading the first gimbal 1252 and the second gimbal 1253 left and right by a user or the like, and may be hung on the rear surface of the body 1251.

Meanwhile, the body 126 may be coupled to the bracket 121 and the plate 122 by coupling the lower pin 127 and the lower hole 123, coupling the side pin 128 and the side hole 124, and coupling the upper pin 129 and the upper hole 1251a in chronological order. In this case, the upper pin 129 and the upper hole 1251a may be coupled by inserting the upper head 1291 into the upper hole 1251a while the body 126 is tilted forward with respect to the body 1251 of the holder 125.

Meanwhile, for the coupling of the bracket 121 and the plate 122 or the coupling of the body 126 to the bracket 121 and the plate 122, various methods such as snap-fit connection, double-sided tape, or welding may be used in addition to the above-described method.

Referring to FIGS. 11 to 13, the body 126 may have a front surface to which the cover 20 is coupled or attached. The body 126 may include a bending part 1261 bent rearward from an end of the body 126.

For example, the bending part 1261 may be bent rearward from the left end of the body 126 and may be located on the left side of the first part 1211 of the first bracket 121a. In this case, the bending part 1261 may cover a left surface of the first part 1211 of the first bracket 121a.

For example, the bending part 1261 may be bent rearward from the right end of the body 126 and may be located on the right side of the first part 1211 of the second bracket 121*b*. In this case, the bending part 1261 may cover a right surface of the first part 1211 of the second bracket 121*b*.

For example, the bending part 1261 may be bent rearward from an upper end of the body 126 and may be located above the first bracket 121*a*, the second bracket 121*b*, and the first plate 122*a*. In this case, the bending part 1261 may cover an upper surface of the first part 1211 of the first bracket 121*a*, an upper surface of the first part 1211 of the second bracket 121*b* and an upper surface of the first plate 122*a*.

For example, the bending part 1261 may be bent rearward from the lower end of the body 126 and may be located below the first bracket 121*a*, the second bracket 121*b*, and the second plate 122*b*. In this case, the bending part 1261 may cover a lower surface of the first part 1211 of the first bracket 121*a*, a lower surface of the first part 1211 of the second bracket 121*b* and a lower surface of the first second 122*b*.

Meanwhile, a first rib 1217 may protrude forward by a certain length 1 from a front surface of the first part 1211 of the first bracket 121*a*. In this case, the certain length 1 may be equal to or less than a thickness t of the first plate 122*a* or the second plate 122*b*.

For example, one first rib 1217 may be provided and may extend in the up-down direction. An upper end of the first rib 1217 may be adjacent to the upper end of the first part 1211, and a lower end of the first rib 1217 may be adjacent to the lower end of the first part 1211. In this case, the first rib 1217 may be located on the left side of the first plate 122*a* and the second plate 122*b*. A portion adjacent to the upper end of the first rib 1217 may be in contact with or spaced apart from a left surface of the first plate 122*a*, and a portion adjacent to the lower end of the first rib 1217 may be in contact with or spaced apart from a left surface of the second plate 122*b*.

For another example, the first rib 1217 may include a first upper rib 1217*a* and a first lower rib 1217*b* spaced apart from each other in the up-down direction. The first upper rib 1217*a* may be adjacent to the upper end of the first part 1211, and the first lower rib 1217*b* may be adjacent to the lower end of the first part 1211. In this case, the first upper rib 1217*a* may be located on the left side of the first plate 122*a*. The first upper rib 1217*a* may be in contact with or spaced apart from a left surface of the first plate 122*a*. Also, the first lower rib 1217*b* may be located on the left side of the second plate 122*b*. The first lower rib 1217*b* may be in contact with or spaced apart from a left surface of the second plate 122*b*.

Meanwhile, the second rib 1218 may protrude forward by the certain length 1 from the front surface of the first part 1211 of the second bracket 121*b*. In this case, the certain length 1 may be equal to or less than the thickness t of the first plate 122*a* or the second plate 122*b*.

For example, one second rib 1218 may be provided and may extend in the up-down direction. An upper end of the second rib 1218 may be adjacent to the upper end of the first part 1211, and a lower end of the second rib 1218 may be adjacent to the lower end of the first part 1211. In this case, the second rib 1218 may be located on the right side of the first plate 122*a* and the second plate 122*b*. A portion adjacent to the upper end of the second rib 1218 may be in contact with or spaced apart from a right surface of the first plate 122*a*, and a portion adjacent to the lower end of the second rib 1218 may be in contact with or spaced apart from a right surface of the second plate 122*b*.

For another example, the second rib 1218 may include a second upper rib 1218*a* and a second lower rib 1218*b* spaced apart from each other in the up-down direction. The second upper rib 1218*a* may be adjacent to the upper end of the first part 1211, and the second lower rib 1218*b* may be adjacent to the lower end of the first part 1211. In this case, the second upper rib 1218*a* may be located on the right side of the first plate 122*a*. The second upper rib 1218*a* may be in contact with or spaced apart from a right surface of the first plate 122*a*. Also, the second lower rib 1218*b* may be located on the right side of the second plate 122*b*. The second lower rib 1218*b* may be in contact with or spaced apart from a right surface of the second plate 122*b*.

The first plate 122*a* may be located between the first rib 1217 and the second rib 1218, and the second plate 122*b* may be located between the first rib 1217 and the second rib 1218.

Accordingly, the first rib 1217 and the second rib 1218 may guide the coupling of the first plate 122*a* and the second plate 122*b* to the bracket 121. In addition, the first rib 1217 and the second rib 1218 may restrict leftward movement of the first plate 122*a* and rightward movement of the second plate 122*b* (see the dotted arrows in FIG. 13), or leftward movement of the first plate 122*a* and rightward movement of the second plate 122*b* (see solid arrows in FIG. 13, so that torsional rigidity and/or bending rigidity of the coupling between the bracket 121 and the plate 122 may be improved.

Referring to FIGS. 14 and 15, a display unit 10 may include the display panel 11 and a frame 13. The frame 13 may be coupled to the display panel 11 at the rear of the display panel 11. For example, electronic components electrically connected to the display panel 11 may be installed on the frame 13. Meanwhile, the frame 13 may be referred to as a main frame, an inner frame, or a module cover.

The frame 13 may be coupled to the first guide frame 112*a*, the second guide frame 112*b*, and the upper frame 113 at a lower side of the first outer frame 111*a*. In this case, the upper frame 113 may support a weight of the display unit 10. Also, a total height of the display panel 11 may be h1.

The cover assembly 120 may be disposed below the display unit 10. In this case, the entire front surface of the display panel 11 may be exposed forward.

The first outer frame 111*a*, the second outer frame 111*b*, the third outer frame 111*c*, and the fourth outer frame 111*d* may cover a side surface of the display unit 10 and the cover assembly 120.

Referring to FIGS. 16 and 17, a lift assembly 130 may be installed on the lower frame 117. FIG. 16 is an enlarged view of region M of FIG. 15. The lift assembly 130 may include a motor 135, a gearbox 136*a* having a plurality of gears 136, a lead screw 131, a slider 137, a rod 133, and a bar 132. In this case, the gearbox 136*a* may be disposed on the lower frame 117.

The motor 135 may provide rotational force. The motor 135 may be installed on a motor mount 1351. For example, the motor 135 may be located above the gearbox 136*a*. In this case, a pole 1352 may be disposed between the motor mount 1351 and the gearbox 136*a*, and may be coupled to the motor mount 1351 and the gearbox 136*a* as it extends in the up-down direction. In addition, a portion of a rotary shaft 135*a* of the motor 135 may be inserted into the gearbox 136*a* to provide rotational force to the plurality of gears 136. Meanwhile, an encoder 135*b* may be installed in the motor 135 to adjust rotation of the motor 135.

The plurality of gears 136 may include a first gear 1351, a second gear 1362, a third gear 1363, a fourth gear 1364, a fifth gear 1365, and a sixth gear 1366. Rotation of the rotary shaft 135*a* may be reduced through the plurality of gears 136. For example, a reduction gear ratio of the first gear 1361 to the sixth gear 1366 may be 6 to 8.

The first gear 1361 may be engaged with the rotary shaft 135a. The second gear 1362 may be coupled to a lower surface of the first gear 1361 and may rotate together with the first gear 1361. In this case, a diameter of the second gear 1362 may be less than a diameter of the first gear 1361. The third gear 1363 may be engaged with the second gear 1362. In this case, a diameter of the third gear 1363 may be greater than the diameter of the second gear 1362. The fourth gear 1364 may be coupled to a lower surface of the third gear 1363 and rotate together with the third gear 1363. In this case, a diameter of the fourth gear 1364 may be greater than the diameter of the third gear 1363. The fifth gear 1365 may be engaged with the third gear 1363. In this case, a diameter of the fifth gear 1365 may be greater than the diameter of the third gear 1363. A gear provided on a lower surface of the fifth gear 1365 may be engaged with the fourth gear 1364.

The lead screw 131 may be coupled to the sixth gear 1366 and rotate together with the sixth gear 1366. The lead screw 131 may extend in the up-down direction and be formed in a cylindrical shape as a whole, and a male thread may be formed on an outer circumferential surface of the lead screw 131. The lead screw 131 may pass through the slider 137.

The slider 137 may be formed in a block shape as a whole, and a hole through which the lead screw 131 passes may be formed. In this case, a female thread engaged with the male thread of the lead screw 131 may be formed in a portion forming a boundary of the hole of the slider 137. The slider 137 may move in the up-down direction along the lead screw 131.

The rod 133 may pass through the slider 137. The rod 133 may extend in the up-down direction and may be fixed to the gearbox 136a. The rod 133 may guide a movement of the slider 137 in the up-down direction, and may restrict rotation of the slider 137 around a vertical axis parallel to the up-down direction. For example, the rod 133 may include a first rod 133a disposed on the left side of the lead screw 131 and a second rod 133b disposed on the right side of the lead screw 131.

The bar 132 may be coupled to or fixed to the slider 137. The bar 132 may extend in the left-right direction and may be coupled to the first bracket 121a (see FIG. 5) and the second bracket 121b (see FIG. 5). For example, a fastening member such as a screw may penetrate the bar 132 and be fastened to the fastening hole 1216 formed in the third part 1213 of the first bracket 121a.

Accordingly, the slider 137, the bar 132, and the cover assembly 120 may move in the up-down direction together according to the rotation of the lead screw 131.

Meanwhile, as described above, the lift assembly 130 may be provided as one or as two or more between the first bracket 121a and the second bracket 121b or in the middle. One of the two lift assemblies 130 may be adjacent to the first bracket 121a, and the other may be adjacent to the second bracket 121b. In this case, the rotation of the motor 135 of the lift assembly 130 adjacent to the first bracket 121a may be synchronized with the rotation of the motor 135 of the lift assembly 130 adjacent to the second bracket 121b.

Referring to FIGS. 18 and 19, the cover assembly 120 may cover a part of the front surface of the display panel 11. For example, an area of the front surface of the display panel 11 corresponding to a second height h2 from a lower end of the display panel 11 upward may be covered by the cover assembly 120. For example, an area of the front surface of the display panel 11 corresponding to the third height h3 from an upper end of the display panel 11 downward may be exposed forward. In this case, a sum of the second height h2 and the third height h3 may be equal to a total height h1 of the display panel 11.

Referring to FIGS. 20 and 21, the slider 137 may move upward along the lead screw 131 and move away from the lower frame 117. FIG. 20 is an enlarged view of region N of FIG. 19.

When the motor 135 is driven to rotate the lead screw 131 in a first direction, the slider 137 may move upward along the lead screw 131. When the motor 135 is driven to rotate the lead screw 131 in a second direction opposite to the first direction, the slider 137 may move downward along the lead screw 131. In this case, a movement distance of the slider 137 may be adjusted by controlling the rotation of the motor 135. For example, motor 135 may be a stepper motor.

Meanwhile, the bar 132 coupled to the slider 137 and the cover assembly 120 may also be moved in the up-down direction together with the slider 137 as described above.

A fixing bar 134 may extend in the left-right direction. The fixing bar 134 may be coupled to the first middle frame 114a and the second middle frame 114b between the first middle frame 114a and the second middle frame 114b. The fixing bar 134 may be disposed on an upper side of the lower frame 117. The lead screw 131 may be rotatably coupled to the fixing bar 134 at a lower side of the fixing bar 134. The first rod 133a and the second rod 133b may be fixed to the fixing bar 134 at the lower side of the fixing bar 134. The fixing bar 134 may contact the slider 137 and restrict upward movement of the slider 137.

Referring to FIGS. 22 and 23, a rail 118 may be installed on the guide frame 112 and may be disposed between the first part 1211 and the third part 1213 of the bracket 121. The rail 118 may extend in the up-down direction, which is a longitudinal direction of the bracket 121.

The rail 118 may include a first flange 1181, a web 1182, and a second flange 1183. The first flange 1181 may form a front surface of the rail 118 and may be fixed to a rear surface of the guide frame 112. The second flange 1183 may form a rear surface of the rail 118. The web 1182 may be coupled to the first flange 1181 and the second flange 1183 between the first flange 1181 and the second flange 1183. For example, a width of the first flange 1181 and a width of the second flange 1183 may be same, and a width of the web 1182 may be less than a width of the first flange 1181. The rail 118 may be formed in a H beam or I beam shape as a whole.

The guide 119 may be fixed to a front surface of the third part 1213 of the bracket 121 and may be movably coupled to the rail 118. The guide 119 may be located behind the rail 118, and a portion of the guide 119 may be bent forward from the guide 119 to hang from or surround the second flange 1183. That is, the guide 119 can slide in the up-down direction along the rail 118 while being coupled to the second flange 1183. For example, the guide 119 may include at least two guides 119 spaced apart from each other in the up-down direction.

For example, a protector may be disposed between the second flange 1183 and the guide 119 to minimize damage to the rail 118 and/or the guide 119 or noise caused by a movement of the guide 119 along the rail 118. For example, a material of the protector may be different from a material of the rail 118 and the guide 119.

The rail 118 may include a first rail 118a for guiding a movement of the first bracket 121a and a second rail 118b for guiding a movement of the second bracket 121b. In this case, the guide 119 may include a first guide 119a movably coupled to the first rail 118a and a second guide 119b movably coupled to the second rail 118b.

Meanwhile, the third outer frame 111c may cover a part of the first bracket 121a. The third outer frame 111c may include a first side frame 111ca and a first rear frame 111cb. The first side frame 111ca may be disposed on a left side of the first bracket 121a. In this case, the first side frame 111ca is disposed on a left side of the second part 1212 of the first bracket 121a and may cover at least a part of the second part 1212. The first rear frame 111cb may be bent and extended from a rear end of the first side frame 111ca to the right toward the third part 1213. In this case, the first rear frame 111cb may be disposed behind the third part 1213 of the first bracket 121a and may cover at least a part of the third part 1213.

Meanwhile, the fourth outer frame 111d may cover a part of the second bracket 121b. The fourth outer frame 111d may include a second side frame 111da and a second rear frame 111db. The second side frame 111da may be disposed on a right side of the second bracket 121b. In this case, the second side frame 111da may be disposed on a right side of the second part 1212 of the second bracket 121b and may cover at least a part of the second part 1212. The second rear frame 111db may be bent and extended from a rear end of the second side frame 111da to the left toward the third part 1213. In this case, the second rear frame 111db may be disposed behind the third part 1213 of the second bracket 121b and may cover at least a part of the third part 1213.

Meanwhile, the display unit 10 may be disposed in front of the first guide frame 112a and the second guide frame 112b, and may be coupled to the first guide frame 112a and the second guide frame 112b. In this case, the display unit 10 may be disposed between the first part 1211 and the third part 1213 of the bracket 121.

A left side 10SS1 of the display unit 10 may be adjacent to an end 111cc of the third outer frame 111c. The end 111cc may protrude from a front end of the first side frame 111ca to the right toward the second part 1212. The left side 10SS1 of the display unit 10 may be spaced apart from the end 111cc of the third outer frame 111c to the right by a certain distance g. For example, the certain distance g may be 3 to 5 mm. In this case, the second part 1212 of the first bracket 121a may be disposed between the left side 10SS1 of the display unit 10 and the end 111cc of the third outer frame 111c. In other words, the second part 1212 of the first bracket 121a may move in the up-down direction through a space or gap between the left side 10SS1 of the display unit 10 and the end 111cc of the third outer frame 111c. In this case, the first part 1211 of the first bracket 121a may be bent to the right from a front end of the second part 1212 and may be disposed in front of the display unit 10.

A right side 10SS2 of the display unit 10 may be adjacent to an end 111dc of the fourth outer frame 111d. The end 111dc may protrude from a front end of the second side frame 111da to the left toward the second part 1212. The right side 10SS2 of the display unit 10 may be spaced apart from the end 111dc of the fourth outer frame 111d to the left by a certain distance g. For example, the certain distance g may be 3 to 5 mm. In this case, the second part 1212 of the second bracket 121b may be disposed between the right side 10SS2 of the display unit 10 and the end 111dc of the fourth outer frame 111d. In other words, the second part 1212 of the second bracket 121b may move in the up-down direction through a space or gap between the right side 10SS2 of the display unit 10 and the end 111dc of the fourth outer frame 111d. In this case, the first part 1211 of the second bracket 121b may be bent to the left from a front end of the second part 1212 and may be disposed in front of the display unit 10.

Referring to FIGS. 24 and 25, a first extension line EL1 may extend in the front-rear direction along the left side 10SS1 of the display unit 10. A second extension line EL2 may extend in the front-rear direction along the end 111cc of the third outer frame 111c. In this case, a gap between the first extension line EL1 and the second extension line EL2 may be g.

The first extension line EL1 and the second extension line EL2 may cross the first rear frame 111cb of the third outer frame 111c. In this case, a portion of the first rear frame 111cb may be disposed between the first extension line EL1 and the second extension line EL2 and may be referred to as a first gap portion 111ct or a first gap area 111ct. A width of the first gap area 111ct may be g. In other words, in the front-rear direction, the first gap area 111ct may overlap or be aligned with a space or gap between the left side 10SS1 of the display unit 10 and the end 111cc of the third outer frame 111c. The first gap area 111ct may be an area exposed forward between the display unit 10 and the third outer frame 111c.

Similarly, a portion of the second rear frame 111db may be exposed forward between the display unit 10 and the fourth outer frame 111d, and may be referred to as a second gap portion 111dt or a second gap area 111dt (see FIG. 23). A width of the second gap area 111dt may be g. In other words, in the front-rear direction, the second gap area 111dt may overlap or be aligned with a space or gap between the right side 10SS2 of the display unit 10 and the end 111dc of the fourth outer frame 111d.

For example, the cover assembly 120 may be disposed below the display panel 11, and the entire first gap area 111ct and the entire the second gap area 111dt may be exposed forward (see FIG. 14). For another example, the cover assembly 120 may cover a part of the front surface of the display panel 11, and a portion of the first gap area 111ct and a portion of the second gap area 111dt may be exposed forward (see FIG. 18).

For example, the color of the first gap area 111ct may be different from the color of other portions of the third outer frame 111c, and the color of the second gap area 111dt may be different from the color of other portions of the fourth outer frame 111d. In this case, the first gap area 111ct and the second gap area 111dt may be colored or black. For another example, a colored or black tape 1110 may be attached to a front surface of the first gap area 111ct and a front surface of the second gap area 111dt.

Also, before painting the first gap area 111ct and the second gap area 111dt in color or black or attaching the tape 1110, the first gap area 111ct and the second gap area 111dt may be anodized. Accordingly, by a film formed through the anodizing process, corrosion resistance of the first gap area 111ct and the second gap area 111dt may be improved and coloring may be facilitated. In addition, since the first gap area 111ct and the second gap area 111dt may have smooth surfaces through the anodizing process, the tape may be easily attached.

Accordingly, user's perception of the gap between the display unit 10 and the third outer frame 111c and the gap between the display unit 10 and the fourth outer frame 111d may be minimized.

In accordance with an aspect of the present disclosure, the display device includes: a display panel; a frame at which the display panel is installed; a cover assembly including a cover disposed in front of the display panel and movably coupled to the frame; and a lift assembly installed at the frame and moving the cover assembly, wherein the cover assembly includes: a body having a front surface to which the cover is coupled; a bracket coupled to a rear surface of the body adjacent to one side of the body, and extending long in a direction in which the cover assembly moves; and a plate coupled to the rear surface of the body adjacent to the other side of the body, and extending long in a direction crossing a longitudinal direction of the bracket.

In addition, in accordance with another aspect of the present disclosure, the bracket may further include: a first part coupled to the rear surface of the body; a second part bent rearward from the first part; and a third part bent left or right from the second part to face the first part and coupled to the lift assembly, wherein the display panel may be disposed between the first part and the third part.

In addition, in accordance with another aspect of the present disclosure, the display device may further include: a display unit including the display panel; a side frame covering a side surface of the second part; a rear frame bent from a rear end of the side frame toward the third part and covering a rear of the third part; and an end protruding from a front end of the side frame toward the second part, wherein the second part may be disposed between the end and an one side of the display unit adjacent to the end.

In addition, in accordance with another aspect of the present disclosure, the rear frame may further include a gap area overlapping a space between the one side of the display unit and the end wherein the gap area may have a color different from a color of other areas of the rear frame or a colored tape is attached to a front surface of the gap area.

In addition, in accordance with another aspect of the present disclosure, the display device may further include a rail installed at the frame, disposed between the first part and the third part, and extending in the longitudinal direction of the bracket, wherein the bracket may further include a guide fixed to a front surface of the third part, coupled to the rail and movable along the rail.

In addition, in accordance with another aspect of the present disclosure, the body may further include a bending part bent rearward from an end of the body to cover a side surface of the first part.

In addition, in accordance with another aspect of the present disclosure, the bracket may further include: a first bracket adjacent to a left side of the body, the first bracket comprising the first part, the second part and the third part; and a second bracket adjacent to a right side of the body, the second bracket comprising the first part, the second part and the third part, wherein the plate may further include: a first plate adjacent to an upper side of the body; and, a second plate adjacent to a lower side of the body.

In addition, in accordance with another aspect of the present disclosure, the first bracket may extend long in a left-right direction, and may be coupled to an upper portion of the first part of the first bracket and an upper portion of the first part of the second bracket, wherein the second bracket may extend long in the left-right direction, and may be coupled to a lower portion of the first part of the first bracket and a lower portion of the first part of the second bracket.

In addition, in accordance with another aspect of the present disclosure, the first bracket may further include a first rib protruding forward by a certain length from a front surface of the first part of the first bracket, wherein the second bracket may further include a second rib protruding forward by a certain length from a front surface of the first part of the second bracket, wherein each of the first plate and the second plate may be disposed between the first rib and the second rib.

In addition, in accordance with another aspect of the present disclosure, the first rib may further include: a first upper rib adjacent to an upper end of the first part of the first bracket; and a first lower rib adjacent to a lower end of the first part of the first bracket, wherein the second rib may further comprises: a second upper rib adjacent to an upper end of the first part of the second bracket; and a second lower rib adjacent to a lower end of the first part of the second bracket, wherein the first plate may be disposed between the first upper rib and the second upper rib, wherein the second plate may be disposed between the first lower rib and the second lower rib.

In addition, in accordance with another aspect of the present disclosure, the plate may include a metal material, wherein the body may include a plastic material.

In addition, in accordance with another aspect of the present disclosure, the body may include a plurality of holes formed to penetrate the body and spaced apart from each other.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
   a display panel;
   a frame at which the display panel is installed;
   a cover assembly including a cover disposed in front of the display panel and movably coupled to the frame; and
   a lift assembly installed at the frame and moving the cover assembly,
   wherein the lift assembly is disposed at a rear of the display panel, and
   wherein the cover assembly comprises:
   a bracket covering a lateral side of the display panel, and connecting the lift assembly and the bracket.

2. A display device comprising:
   a display panel;
   a frame at which the display panel is installed;
   a cover assembly including a cover disposed in front of the display panel and movably coupled to the frame; and a lift assembly installed at the frame and moving the cover assembly, wherein the cover assembly comprises:

a body having a front surface to which the cover is coupled;

a bracket coupled to a rear surface of the body adjacent to a first side of the body, and extending along in a direction in which the cover assembly moves; and a plate coupled to the rear surface of the body adjacent to a second side of the body, and extending along in a direction crossing a longitudinal direction of the bracket, wherein the bracket further comprises:

a first part coupled to the rear surface of the body;

a second part bent rearward from the first part; and a third part bent left or right from the second part to face the first part and coupled to the lift assembly, wherein the display panel is disposed between the first part and the third part.

3. The display device of claim 2, further comprising:

a display unit including the display panel;

a side frame covering a side surface of the second part;

a rear frame bent from a rear end of the side frame toward the third part and covering a rear of the third part; and an end protruding from a front end of the side frame toward the second part, wherein the second part is disposed between the end and a first side of the display unit adjacent to the end.

4. The display device of claim 3, wherein the rear frame further comprises a gap area overlapping a space between the first side of the display unit and the end, wherein the gap area has a color different from a color of other areas of the rear frame or a colored tape is attached to a front surface of the gap area.

5. The display device of claim 2, further comprising a rail installed at the frame, disposed between the first part and the third part, and extending in the longitudinal direction of the bracket, wherein the bracket further comprises a guide fixed to a front surface of the third part, coupled to the rail and movable along the rail.

6. The display device of claim 2, wherein the body further comprises a bending part bent rearward from an end of the body to cover a side surface of the first part.

7. A display device comprising:

a display panel;

a frame at which the display panel is installed;

a cover assembly including a cover disposed in front of the display panel and movably coupled to the frame; and a lift assembly installed at the frame and moving the cover assembly, wherein the cover assembly comprises:

a body having a front surface to which the cover is coupled;

a bracket coupled to a rear surface of the body adjacent to a first side of the body, and extending along in a direction in which the cover assembly moves; and a plate coupled to the rear surface of the body adjacent to a second side of the body, and extending along in a direction crossing a longitudinal direction of the bracket, wherein the bracket comprises:

a first part coupled to the rear surface of the body;

a second part bent rearward from the first part; and a third part bent left or right from the second part to face the first part and coupled to the lift assembly, wherein the display panel is disposed between the first part and the third part, wherein the bracket further comprises:

a first bracket adjacent to a left side of the body, the first bracket comprising the first part, the second part and the third part; and a second bracket adjacent to a right side of the body, the second bracket comprising the first part, the second part and the third part, wherein the plate further comprises:

a first plate adjacent to an upper side of the body; and, a second plate adjacent to a lower side of the body.

8. The display device of claim 7, wherein the first bracket extends long in a left-right direction, and is coupled to an upper portion of the first part of the first bracket and an upper portion of the first part of the second bracket, wherein the second bracket extends long in the left-right direction, and is coupled to a lower portion of the first part of the first bracket and a lower portion of the first part of the second bracket.

9. The display device of claim 8, wherein the first bracket further comprises a first rib protruding forward by a certain length from a front surface of the first part of the first bracket, wherein the second bracket further comprises a second rib protruding forward by a certain length from a front surface of the first part of the second bracket, wherein each of the first plate and the second plate is disposed between the first rib and the second rib.

10. The display device of claim 9, wherein the first rib further comprises:

a first upper rib adjacent to an upper end of the first part of the first bracket; and a first lower rib adjacent to a lower end of the first part of the first bracket, wherein the second rib further comprises:

a second upper rib adjacent to an upper end of the first part of the second bracket; and a second lower rib adjacent to a lower end of the first part of the second bracket, wherein the first plate is disposed between the first upper rib and the second upper rib, wherein the second plate is disposed between the first lower rib and the second lower rib.

11. The display device of claim 2, wherein the plate comprises a metal material, wherein the body comprises a plastic material.

12. The display device of claim 9, wherein the body comprises a plurality of holes formed to penetrate the body and spaced apart from each other.

* * * * *